United States Patent
Kamimoto et al.

(10) Patent No.: US 10,248,511 B2
(45) Date of Patent: Apr. 2, 2019

(54) STORAGE SYSTEM HAVING MULTIPLE LOCAL AND REMOTE VOLUMES AND MULTIPLE JOURNAL VOLUMES USING DUMMY JOURNALS FOR SEQUENCE CONTROL

(71) Applicant: Hitachi, Ltd., Tokyo (JP)

(72) Inventors: Ryunosuke Kamimoto, Tokyo (JP); Hideo Saito, Tokyo (JP); Azusa Jin, Tokyo (JP); Keishi Tamura, Tokyo (JP); Takahiko Takeda, Tokyo (JP); Takashi Sakaguchi, Tokyo (JP); Hiroyuki Morimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 15/509,206

(22) PCT Filed: Nov. 26, 2014

(86) PCT No.: PCT/JP2014/081220
§ 371 (c)(1),
(2) Date: Mar. 7, 2017

(87) PCT Pub. No.: WO2016/084156
PCT Pub. Date: Jun. 2, 2016

(65) Prior Publication Data
US 2017/0277600 A1    Sep. 28, 2017

(51) Int. Cl.
*G06F 3/06* (2006.01)
*G06F 11/14* (2006.01)
(Continued)

(52) U.S. Cl.
CPC ............ *G06F 11/1458* (2013.01); *G06F 3/06* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

2005/0055523 A1   3/2005 Suishu et al.
2008/0243946 A1* 10/2008 Deguchi ............. G06F 11/1471
(Continued)

OTHER PUBLICATIONS

International Search Report of PCT/JP2014/081220 dated Feb. 24, 2015.

*Primary Examiner* — Reginald G Bragdon
*Assistant Examiner* — Marwan Ayash
(74) *Attorney, Agent, or Firm* — Mattingly & Malur, PC

(57) ABSTRACT

A primary storage system is equipped with a local storage subsystem having a mirror volume of a volume in a primary storage subsystem, and a remote storage subsystem having a mirror volume of the volume in the primary storage subsystem at a secondary site. When storing a write data from a host to a volume, the primary storage subsystem determines an SEQ# to be stored in a journal corresponding to the write request, creates a journal including the relevant SEQ# and a replica of the write data, and transmits the relevant SEQ# to the local storage subsystem, which creates a journal including the relevant SEQ# and stores it in its own journal volume. But when creation of the journal including the relevant SEQ# is stopped, the local storage subsystem creates a dummy journal including the relevant SEQ# but not including the write data.

12 Claims, 19 Drawing Sheets

(51) Int. Cl.
*G06F 12/00* (2006.01)
*G06F 17/30* (2006.01)

(52) U.S. Cl.
CPC ........ *G06F 3/0614* (2013.01); *G06F 11/1461* (2013.01); *G06F 11/1469* (2013.01); *G06F 12/00* (2013.01); *G06F 17/30082* (2013.01); *G06F 17/30191* (2013.01)

(56) References Cited

U.S. PATENT DOCUMENTS

2011/0251999 A1\* 10/2011 Takahashi ........... G06F 11/2058 707/636
2015/0234860 A1\* 8/2015 Sakaguchi ........ G06F 17/30191 707/622

\* cited by examiner

Fig. 3

| LDEV# | VLDEV# | Synchronous Pair # | Asynchronous Pair # |
|---|---|---|---|
| 1 | 1 | 1 | 3 |
| 2 | 2 | 2 | 4 |
| 3 | 3 | 1 | 3 |
| 4 | 4 | 2 | 4 |
| : | : | : | : |

| Pair# | Pair Status | PDKC# | PVOL# | SDKC# | SVOL# | Gr.# | copy pointer |
|---|---|---|---|---|---|---|---|
| 1 | 1 | 0 | 1 | 1 | 0 | 1 | 0 |
| 2 | 1 | 0 | 2 | 1 | 1 | 1 | 0 |
| 3 | 0 | 0 | 1 | 2 | 3 | 2 | 0 |
| 4 | 0 | 0 | 2 | 2 | 2 | 2 | 0 |
| : | : |   | : |   |   |   |   |
|   | : |   | : |   |   |   |   |
|   |   |   |   |   |   |   |   |

T301, T302, T303, T304, T305, T306, T307, T308

Row 311
Row 313

<u>Pair Status</u>
0: Initial-copy
1: Duplex
2: Suspend
3: Duplex-pending

Fig. 5

| Gr# | Pair# | JVOL# | counter DKC# | Gr.# | |
|---|---|---|---|---|---|
| 1 | 1, 2 | NULL(-1) | 1 | 1 | Row411 |
| 2 | 3, 4 | 1 | 2 | 1 | Row 412 |
| : | : | : | | | |
| | : | : | | | |
| | | | | | |

| SEQ# | Acquired bit | Created bit | Not-created bit | Duplication-ongoing bit |
|------|--------------|-------------|-----------------|-------------------------|
| 1 | 1 | 1 | 0 | 0 |
| 2 | 1 | 1 | 0 | 0 |
| 3 | 1 | 0 | 0 | 1 |
| 4 | 1 | 1 | 0 | 0 |
| ... | ... | ... | ... | ... |
| n | ... | ... | ... | ... |

T801 — SEQ#
T802 — Acquired bit
T803 — Created bit
T805 — Not-created bit
T804 — Duplication-ongoing bit
T800 — SEQ# Management Information 811 — Created SEQ # (→ row 2)
810 — Acquired SEQ # (→ row 4)
813 — Previously created SEQ #
813' — Previous time

Fig. 17

| SEQ# | Acquired bit | Created bit | Not-created bit | Duplication-ongoing bit | |
|---|---|---|---|---|---|
| | | | | | |
| 10 | 1 | 1 | 0 | 0 | ← Created SEQ # |
| 11 | 0 | 0 | 0 | 0 | |
| 12 | 1 | 1 | 0 | 0 | ← Acquired SEQ # |
| 13 | 0 | 0 | 0 | 0 | |
| ... | ... | ... | ... | ... | |

Fig. 19

| SEQ# | Acquired bit | Created bit | Not-created bit | Duplication-ongoing bit | |
|---|---|---|---|---|---|
|  |  |  |  |  | |
| 10 | 1 | 1 | 0 | 0 | ← Created SEQ # |
| 11 | 1 | 0 | 1 | 0 | |
| 12 | 1 | 1 | 0 | 0 | ← Acquired SEQ # |
| 13 | 0 | 0 | 0 | 0 | |
| ... | ... | ... | ... | ... | |

STORAGE SYSTEM HAVING MULTIPLE LOCAL AND REMOTE VOLUMES AND MULTIPLE JOURNAL VOLUMES USING DUMMY JOURNALS FOR SEQUENCE CONTROL

TECHNICAL FIELD

The present invention relates to a technique for enhancing the availability of storage systems.

BACKGROUND ART

Currently, in many storage subsystems, a technique for enhancing reliability, such as a RAID (Redundant Arrays of Independent (or Inexpensive) Disks) technique, is adopted to provide reliability that exceeds the reliability of individual HDDs. However, along with the recent advancement of the information-oriented society, there are cases where the reliability provided by the RAID technique is not sufficient.

In order to cope with this situation, a technique is provided where a replica of information stored in a volume of a storage subsystem is retained in a different storage subsystem. For example, Patent Literature 1 discloses a data processing system where contents of a volume (PVOL) in a primary storage system A (hereinafter referred to as "PDKC") are mirrored to secondary storage systems B (RDKC) and C (LDKC).

In a data processing system disclosed in Patent Literature 1, the PDKC stores a write data received from a host computer in its own volume, and creates a journal including the relevant write data. At this time, the PDKC generates an update number, which is a unique serial number, and stores the number in the journal. The PDKC sends the journal to the RDKC, and the RDKC stores the replica of the write data in its own volume based on the received journal.

Further, the LDKC receives the replica of the write data and the update number from the PDKC, stores the replica of the write data to its own volume, and creates a journal. When failure occurs to the PDKC, the LDKC takes over the operation that the PDKC was performing (processes related to the access request from a host computer), and changes the configuration such that the replica of the volume of the LDKC is retained in the RDKC. Moreover, the LDKC transmits the above-created journal to the RDKC, and the RDKC reflects the data included in the received journal to its own volume in the order of the update number. Thereby, a state is maintained where the replica of the volume of the LDKC is retained in the RDKC without having to copy all the contents of the volume of the LDKC to the RDKC.

When the RDKC reflects the data included in the journal to the volume, it checks the update number. When it is determined that the journal required in the RDKC is not stored in the LDKC, all the contents of the volume of the LDKC must be copied to the RDKC. A case where the journal required in the RDKC is not stored in the LDKC is, for example, when "newest update number of journal arriving at RDKC+1<oldest update number of journal in LDKC". In that case, the update numbers of journals received by the RDKC (journals received from the PDKC before failure of PDKC, and journals received from LDKC) will be non-successive. In other words, it means that a part of the write data from the host computer is missing. As a result, it is not possible to create a replica volume using journals, so that all the contents of the volume must be copied.

CITATION LIST

Patent Literature

[PTL 1] US Patent Application Publication No. 2005/0055523

SUMMARY OF INVENTION

Technical Problem

During normal operation, transmission delay of data (corresponding to a journal) related to a part of update I/O from the PDKC to the LDKC may occur due to some failure (supposing that journal of update number "a" has not been created). In this case, the LDKC waits for arrival of the relevant update I/O and creation of a journal regarding the relevant update I/O. However, the subsequent journals regarding the plurality of update I/Os arrive at the LDKC, and are stored as journals having update numbers a+1, a+2 and so on to the journal volume. Since there is a limitation in the amount of journal accumulation, it is necessary to discard journals that are not required to be retained (journals having older update numbers than the journal having arrived at the RDKC), but the non-created journal and journals having a newer update number that the non-created journal cannot be discarded, such that the journals can no longer be accumulated.

Solution to Problem

The storage system according to one preferred embodiment of the present invention comprises a primary storage system which includes a primary storage system and a local storage subsystem having a mirror volume of a volume in the primary storage subsystem, and a remote storage subsystem having a mirror volume of the volume in the primary storage subsystem at a secondary site. When the primary storage subsystem stores write data from the host into the volume, it determines a SEQ# to be stored in a journal related to the relevant write request, creates a journal including the relevant SEQ# and a replica of the write data, and thereafter, transmits the relevant SEQ# to the local storage subsystem. The local storage subsystem creates a journal including the relevant SEQ# and the write data and stores the journal in its own journal volume, but when the primary storage subsystem stops journal creation after determining the SEQ#, the local storage subsystem creates a dummy journal including the relevant SEQ# but not including the write data.

Advantageous Effects of Invention

According to the present invention, operation can be continued even when failure occurs where a part of the journals is not created.

BRIEF DESCRIPTION OF DRAWINGS

FIG. 3 is a view illustrating a content of a logical volume management table.

FIG. 4 is a view illustrating a content of a pair management table.

FIG. 5 is a view illustrating a content of a group management table.

FIG. 7 is a view illustrating a content of SEQ# management information.

FIG. 17 is a view illustrating one example of a content of SEQ# management information.

FIG. 19 is a view illustrating one example of a content of SEQ# management information.

DESCRIPTION OF EMBODIMENTS

Figure 1:
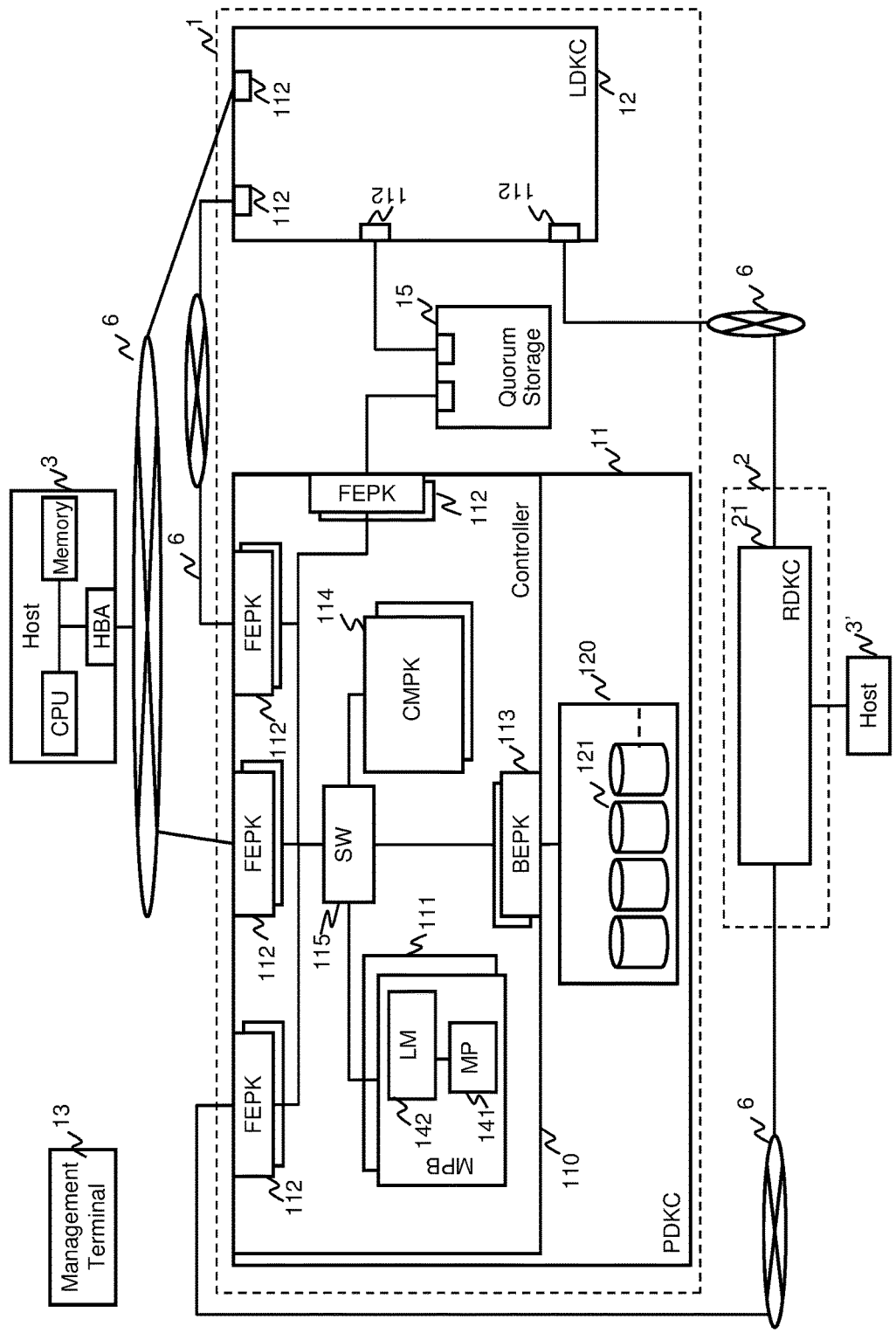
FIG. 1 is a view illustrating an outline of operation of a computer system.

Now, a storage system according to one preferred embodiment of the present invention will be described with reference to the drawings. However, the present invention is not restricted to the preferred embodiments described below.
<Embodiment 1>
(1) System Configuration FIG. 1 illustrates a configuration of a computer system according to one preferred embodiment of the present invention. The computer system includes a primary storage system 1 having a primary storage subsystem (also referred to as PDKC) 11 and a local storage subsystem (also referred to as LDKC) 12, a host 3 connected to the primary storage 1, a secondary storage system 2 having a remote storage subsystem (also referred to as RDKC) 21 connected to the PDKC 11 and the LDKC 12, and a host 3' connected to the secondary storage system 2. In the present embodiment, the set of the primary storage system 1 and the secondary storage system 2 is called a "storage system".

The PDKC 11 is connected via a Storage Area Network (SAN) 6 to the host 3 and other storage subsystems such as the LDKC 12. The SAN 6 is a network composed of a transmission line such as a Fibre Channel cable, and one or more Fibre Channel switches. However, it is also possible to directly connect the PDKC 11 and the host 3 via a transmission line, without having a Fibre Channel switch intervened. In FIG. 1, the PDKC 11 and the host 3 or the LDKC 12 are connected via a single transmission line, but in order to enhance fault tolerance, the PDKC 11 and the host 3 or the PDKC 11 and the LDKC 12 can each be respectively connected via a plurality of transmission lines.

The PDKC 11 is composed of a storage controller (sometimes abbreviated as "controller") 110 and a disk unit 120 comprising multiple drives 121. The storage controller 110 adopts a configuration in which an MPB 111 which is a processor board executing control such as I/O process performed in the PDKC 11, a frontend package (FEPK) 112 having a data transfer interface with the host 3 or the LDKC 12, a backend package (BEPK) 113 which is a data transfer interface with the disk unit 120, and a memory package (CMPK) 114 having a memory for storing cache data and control information are mutually connected via a switch (SW) 115. The number of the respective components (MPB 111, FEPK 112, BEPK 113 and CMPK 114) is not restricted to the number illustrated in FIG. 1, but in order to ensure high availability, multiple numbers of respective components normally exist. It is also possible to add these components later.

Each MPB 111 is a package board having one or more processors (also referred to as MP) 141, and a local memory 142 storing the data used by the relevant processor 141. The CMPK 114 includes an area used as a so-called disk cache for temporarily storing write data from the host 3 or data read from the drive 121, and a shared memory area (also referred to as SM) which is an area for storing control information and the like used by the MPB 111. The information stored in the SM is accessible from all MPs 141 within all MPBs 111. Further, a means (such as a battery) for preventing data from being lost during power outage or other failures can be provided to the CMPK 114.

Figure 2:
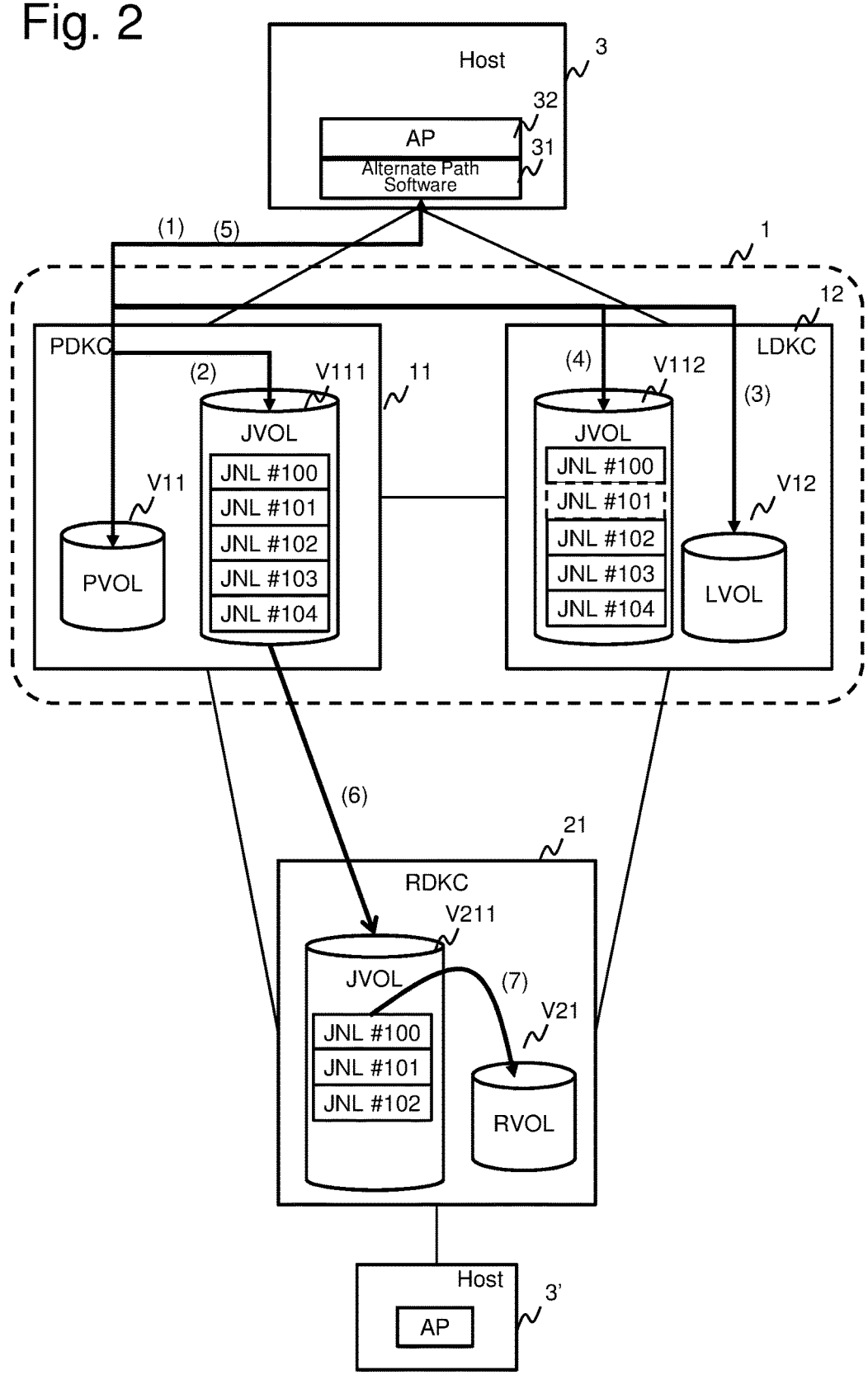
FIG. 2 is a view illustrating an outline of data copy performed in the computer system according to a present embodiment.

The FEPK 112 is a package board for performing transmission and reception of data with other devices (such as the host 3 or the LDKC 12), and has one or more interfaces for connecting to the SAN 6. A Fibre Channel interface is used as an example of the interface. In FIG. 2, the PDKC 11 and the LDKC 12/RDKC 21 are connected via a single transmission line, but actually, the PDKC 11 and the LDKC 12 are connected via multiple transmission lines. Further, the number of transmission lines between the host 3 and the PDKC 11 is not restricted to the configuration illustrated in FIG. 1, and there can be multiple transmission lines.

The BEPK 113 is a package board for performing data transmission and reception with the drive 121, and has one or more interfaces for connecting with the drive 121. An SAS (Serial Attached SCSI) is used as an example of the interface.

The disk unit 120 has multiple drives 121, and each drive 121 mainly stores write data from the host 3. Magnetic disks such as HDDs can be used as the drives 121, for example, but storage media other than HDDs, such as SSDs (Solid State Drives), can also be used.

The LDKC 12 is a device having similar configuration elements as the PDKC 11 (the internal configuration is not shown in FIG. 1). However, the number of respective components (such as the MPB 111, the FEPK 112, the drive 121 and so on) is not necessarily the same as the PDKC 11. Hereafter, in the description of the functions and the like that both the PDKC 11 and the LDKC 12 have in common, the PDKC 11 and the LDKC 12 are not distinguished, and they will be commonly referred to as "the storage subsystem".

The primary storage system 1 can be provided with a Quorum Storage 15. The Quorum Storage 15 is connected to the PDKC 11 and the LDKC 12. The Quorum Storage 15 is a storage device having at least one volume. Further, the PDKC 11 and the LDKC 12 have a function to access (read or write) volumes that the storage device has when a storage device such as the Quorum Storage 15 is connected to the interface of the FEPK 112. Hereafter, the volume that the Quorum Storage 15 has is referred to as a "Quorum Disk".

The Quorum Disk is used so that the PDKC 11 and the LDKC 12 recognize their status each other. Both the PDKC 11 and the LDKC 12 periodically write health check information into the Quorum Disk. Further, by referring to the health check information stored in the Quorum Disk, the PDKC 11 confirms whether the LDKC 12 is operating normally or not, and the LDKC 12 confirms whether the PDKC 11 is operating normally or not.

The hardware configuration of the Quorum Storage 15 can be the same hardware configuration as the PDKC 11 or the LDKC 12, or can be different hardware configurations. Further, FIG. 1 illustrates a configuration where the PDKC 11 (or the LDKC 12) and the Quorum Storage 15 are connected via a single transmission line, but a configuration where multiple transmission lines are provided between the PDKC 11 (or the LDKC 12) and the Quorum Storage 15 can also be adopted.

The host 3 is a computer for executing programs (AP) used by the user, and has a processor (CPU), a memory, and an HBA (Host Bus Adapter) for connecting the host 3 to the SAN 6. The host 3 is in a state capable of accessing both the PDKC 11 and the LDKC 12 via the SAN 6. The details will be described later, but as illustrated in FIG. 1, an alternate path software 31 in addition to the application program (AP) 32 which is an operation program used by the user are executed in the CPU of the host 3.

The secondary storage system 2 has the RDKC 21, and the RDKC 21 is connected to the host 3'. The secondary storage system 2 is provided to take over the operation having been performed in the primary storage system 1 in a case where the primary storage system 1 stops due to disaster or other causes. The RDKC 21 is a device having similar components as the PDKC 11 (the internal configuration is not shown in FIG. 1). However, the number of the respective components is not necessarily the same as the PDKC 11 or the LDKC 12. Hereafter, in the description of the functions and the like that the PDKC 11, the LDKC 12 and the RDKC 21 have in common, the PDKC 11, the LDKC 12 and the RDKC 21 are not distinguished, and they will be commonly referred to as "the storage subsystem".

The host 3' is a computer having a similar configuration as the host 3. However, the host 3' and the host 3 are not required to have the same components. The host 3' is provided to take over the operation performed in the host 3 when the primary storage system 1 and the host 3 stop due to causes such as a disaster.

(2) Outline of Operation

Next, we will describe the outline of the process performed in the computer system of the present embodiment for processing I/O requests from the host 3. At first, we will describe the volumes provided by the PDKC 11 and the LDKC 12 to the host 3. The storage subsystem creates one or more logical volumes (also referred to as LDEVs) using the storage area of multiple drives 121 existing within its own disk unit 12. These logical volumes are provided to the host 3. These processes are performed by having the control program executed by the MP 141 of the storage subsystem. The method for creating logical volumes and the method for providing the created logical volume to the host 3 is the same as those performed in conventional storage subsystems.

In principle, in the primary storage system 1 according to the preferred embodiment, the write data from the host 3 is written into both the logical volume of the PDKC 11 and the logical volume of the LDKC 12 (so that a so-called data duplication is performed). The data written to the logical volume of the PDKC 11 is also copied to the logical volume of the RDKC 21.

The outline of this process will be described with reference to FIG. 2. This process is executed by the storage subsystems (PDKC 11, LDKC 12 and RDKC 21). In FIG. 2, the arrows denoted by numbers from (1) to (6) show the flow of write data when the PDKC 11 receives a write request (write command) and write data from the host 3.

When the PDKC 11 receives a write request and write data to a logical volume V11 from the host 3, the PDKC 11 stores the write data to the logical volume V11 disposed in its own subsystem (1). Further, the PDKC 11 creates a journal including a replica of the write data, and stores the journal in a journal volume (JVOL) (V111) (2). A journal volume is a volume for storing journals, and it is a kind of a logical volume. The contents of the journal will be described later.

Further, the PDKC 11 transmits a replica of the write data to the LDKC 12. When the LDKC 21 receives the replica of the write data from the PDKC 11, it stores the replica of the write data to a logical volume V12 in LDKC 21 (3). Thereby, a state is maintained where identical data are stored in the logical volume V11 and the logical volume V12. Further, in a state where the LDKC 12 stores the replica of the write data to the logical volume V12 (3), it creates a journal from the replica of the write data, and stores the created journal to the journal volume (V112) (4).

In the state where (4) is completed, the LDKC 12 returns a response to the PDKC 11 notifying that the process has been completed. When the PDKC 11 receives a response from the LDKC 12 that process has been completed, the PDKC 11 notifies the host 3 that process concerning the write request has been completed (hereafter, this notice is called a "write completion notice" (5)). In other words, after confirming that data has been stored in both the logical volume V11 and the logical volume V12, the primary storage system 1 notifies the host 3 that the process concerning the write request has been completed. This process is referred to as a synchronous copy process.

At the point of time when the host 3 receives a write completion notice, it confirms that the process concerning the write request has been completed. In other words, the host 3 determines that the data transmitted together with the write request to the PDKC 11 has not been securely stored in the logical volume V11 (and the logical volume V12) until it receives the write completion notice. Further, if data is not stored in at least either the logical volume V11 or the logical volume V12 due to some cause, the PDKC 11 notifies the host 3 that the process concerning the write request has failed.

The journal stored in the journal volume (V111) after the process of (2) is transmitted to the RDKC 21, and stored in the journal volume (V211) in the RDKC 21 (6). This transmission process can be performed at an arbitrary point of time later than the point of time when the PDKC 11 returns the write completion notice to the host 3 (that is, point of time of (5)). The RDKC 21 reads journals sequentially from the journal volume (V211) and stores a replica of the write data (included in the journal) to logical volume V21 in the RDKC 21 (7). Thereby, identical data are stored in the logical volume V11 and the logical volume V21. However, the processes of (6) and thereafter may be performed at a point of time later than (5), so that the write data written to the logical volume V11 is replicated to the logical volume V21 at a somewhat later timing. The process of replicating the data of the logical volume V11 to the logical volume V21 is called a "asynchronous copy process".

In the following description, the process performed in (7), that is, the process/operation of storing the replica of the write data included in the journal to the logical volume V21 is called "restoring". Further, the process for storing a replica of write data included in a journal (this journal is temporarily referred to as "journal A") to the logical volume V21 is described as "restoring journal A".

Further, when the PDKC 11 receives a write request of a plurality of write data (temporarily, the plurality of write data are called DATA 1, DATA 2 and DATA 3), such as when the write request of DATA 1 is received at time t1, the write request of DATA 2 is received at time t2, and the write request of DATA 3 is received at time t3 (where t1<t2<t3), data of DATA 1, DATA 2 and DATA 3 are sequentially written in the named order to the logical volumes V11 and V12. Further, data of DATA 1, DATA 2 and DATA 3 are also written in the named order to the logical volume V21. That is, the order of data write to the respective logical volumes (V11, V12 and V21) is controlled to be the same. In order to realize this operation, a unique number called a sequence number (SEQ#) is included in each journal.

The sequence number (SEQ#) is a serial number determined by the PDKC 11. When the PDKC 11 receives a write request of DATA 1, DATA 2 and DATA 3, for example, the PDKC 11 creates a journal including DATA 1 and SEQ #100, and stores the same in JVOL (V111) ("SEQ #100 refers to a sequence number whose number is 100"). Next, it creates a journal including DATA 2 and SEQ #101, and stores the same in the JVOL (V111). Further, it creates a journal including DATA 3 and SEQ# 102, and stores the same in the JVOL (V111). Here, "JNL #100" shown within the journal volumes (V111, V112 and V211) in FIG. 2 refers to the journal including the SEQ #100.

When these journals are stored in the JVOL (V211) in the RDKC 21, the RDKC 21 performs restoration of the journal sequentially from the journal having the smallest SEQ#. Further, since the SEQ# is a serial number, for example, after restoring the journal having SEQ #100 assigned thereto (JNL #100), it restores the journal having SEQ #101 assigned thereto (journal #101). If journal #101 is not stored in JVOL (V211), the execution of the restore process is set to standby until the journal #101 is stored in the JVOL (V211). Thereby, when a plurality of data is stored in the logical volumes V11 and V21, the respective data are written in the same order to the logical volumes V11 and V21.

Further, when the PDKC 11 transits a replica of the write data to the LDKC 12, the sequence number is transmitted to the LDKC 12 together with the replica of the write data. For example, if the PDKC 11 creates a journal including DATA 1 and SEQ #100 and stores the same in the JVOL (V111), it sends SEQ #100 together with DATA 1 to the LDKC 12. The LDKC 12 creates a journal based on the transmitted DATA 1 and SEQ #100, and stores the created journal in the JVOL (V112).

The journal stored in the JVOL (V112) is used for example when failure occurs to the PDKC 11 and the PDKC 11 stops. When the PDKC 11 stops, the host 3 can no longer write data to the logical volume V11. Further, the process of replicating the data written in the logical volume V11 to the logical volume V21 will no longer be performed. In this case, the host 3 changes the access destination logical volume such that access is performed to the logical volume V12 in the LDKC 12. Further, the configuration of the computer system is changed such that the LDKC 12 transmits the replica of data (journal) to the RDKC 21 instead of the PDKC 11.

In order to continue execution of the data replication process from the LDKC 12 to the RDKC 21, all the journals created in the PDKC 11 (journals stored in JVOL (V111)) must be copied to the JVOL (V211) of the RDKC 21. In the example of FIG. 2, journals from JNL #100 to JNL #104 are stored in the JVOL (V111). However, only JNL #100 to JNL #102 are stored in the JVOL (V211). When the PDKC 11 stops at this point of time, the RDKC 21 cannot restore JNL #103 and JNL #104. Therefore, the RDKC 21 acquires JNL #103 and JNL #104 from the LDKC 12, and performs restoration of JNL #103 and JNL #104. Thereby, the contents of the logical volumes V12 and V21 become identical, and the computer system can be operated continuously. The method disclosed in Patent Literature 1 can be used as the details of this process.

According further to the computer system of the present embodiment, in a state where the host 3 issues a write request to the logical volume V12 in the LDKC 12, data is replicated both to the logical volume V11 and the logical volume V21. The outline of the process performed in that case will be described below.

When the LDKC 12 receives a write request and write data to the logical volume V11 from the host 3, the LDKC 12 instructs the PDKC 11 to store the write data, and transmits the write data. When the PDKC 11 receives this instruction, it performs processes (1) and (2) described earlier. In the process of (2), the PDKC 11 determines the SEQ# to be stored into the journal.

When the processes of (1) and (2) are ended, the PDKC 11 reports process completion to the LDKC 12. At this time, the SEQ# generated in (2) is returned to the LDKC 12. In the LDKC 12, the write data received from the host 3 is stored in the logical volume V12. In addition thereto, a journal including the write data and the SEQ# received from the PDKC 11 is created and stored in the JVOL (V112). Thereafter, the LDKC 12 reports process completion to the PDKC 11, and transmits a write completion notice to the host 3.

The transmission of the journal to the RDKC 21 and the restoration of the journal are the same as (6) and (7) described above. Since these processes are performed according to the computer system of Embodiment 1, identical data are stored in all logical volumes (V11, V12 and V21) when the host 3 writes data to either the logical volume V11 or the logical volume V12. Further, since identical data is stored in all logical volumes (V11, V12 and V21), the same data can be read when the host 3 reads data from either the logical volume V11 or the logical volume V12.

The logical volume to which the write data from the host 3 is first written among the logical volumes V11 and V12 is determined by a kind of attribute that is set to the logical volume. The logical volume to which data is written first is called a primary volume (also referred to as P-VOL) and the logical volume to which data is written second is called a local volume (also referred to as L-VOL). Further, the logical volume V21 in the RDKC 21 is referred to as a remote volume (also referred to as R-VOL). FIG. 2 illustrates an example of a case where the logical volume V11 is set as the P-VOL and the logical volume V12 is set as the L-VOL.

The fact that the logical volume V11 and the logical volume V12 are logical volumes located in different storage subsystems is at least not recognized by AP 32 of the host 3. In the computer system according to the present embodiment, by assigning the same volume identifier to the logical volume V11 and the logical volume V12, the alternate path software 31 of the host 3 is configured to recognize that the logical volume V11 and the logical volume V12 are identical volumes.

In the configuration of FIG. 2, the alternate path software 31 is operated in the host 3. The alternate path software 31 has a function to recognize the plurality of access paths (called paths) when a plurality of paths from the host 3 to the logical volumes exist. It also has a function to select a path to be used among the plurality of paths when accessing the logical volume. In order to recognize the paths, the alternate path software 31 issues a command for acquiring identification information of volumes, such as INQUIRY command defined by SCSI standards, to the logical volumes recognizable (accessible) from the host 3, so as to acquire volume identifiers.

The storage system 1 is configured such that when the PDKC 11 receives an INQUIRY command to the logical volume V11, or when the LDKC 11 receives an INQUIRY command to the logical volume V12, the same volume identifier is returned to a command transmission source (the host 3). Therefore, the alternate path software 31 recognizes that the logical volumes V11 and V12 are identical volume. As a result, it recognizes that an alternate path of the path from the host 3 to the logical volume V11 (called path 1) is the path from the host 3 to the logical volume V12 (called path 2). If path 1 is disconnected due to failure, or if path 1 is busy, for example, when the alternate path software 31 receives an access request to the logical volume V11 from the application program 32 or the like, the alternate path software 31 issues an access request through path 2 (that is, issues an access request to the logical volume V12). Even if the alternate path software 31 issues an access request to the logical volume V12, since the logical volume V12 stores the same data as the logical volume V11, no problem will occur during operation.

(3) Configuration of Management Information

Next, we will describe the contents of management information that the storage subsystem holds. Each storage subsystem according to the present embodiment at least stores, as information for managing volumes, a logical volume management table T200, a pair management information T300 and a group management table T400 in the SM. These management information are created by the user issuing an instruction to the storage subsystem using a management software operating in a management terminal (not shown) or the host 3.

The logical volume management table T200 illustrated in FIG. 3 is a table for managing each logical volume in the storage subsystem. An identifier unique within each storage subsystem is assigned to each logical volume, and this identifier is called logical volume number (also referred to as LDEV# or VOL#). As mentioned earlier, the volumes having data duplicated in the PDKC 11 and the LDKC 12 both return the same volume identifier to the host. In the present embodiment, this volume identifier is called virtual logical volume number (also referred to as VLDEV#). The same VLDEV# must be set for the volumes to which data duplication has been performed. The value of the VLDEV# is not necessarily the same as the LDEV# (however, the values can be the same). The logical volume management table T200 is information stored in each of the PDKC 11 and the LDKC 12, and are stored in the SM of each storage subsystem.

Incidentally, the logical volume management table T200 managed by the PDKC 11 stores information of respective logical volumes (such as LDEV# (T201) and VLDEV# (T202)) managed by the PDKC 11, and the logical volume management information 200 managed by the LDKC 12 stores information of respective logical volumes (such as LDEV# (T201) and VLDEV # (T202)) managed by the LDKC 12. The logical volume management information 200 managed by the RDKC 21 stores information of respective logical volumes (such as LDEV# (T201) and VLDEV# (T202)) managed by the RDKC 21. Synchronous pair# (T203) and asynchronous pair# (T204) will be described later together with the contents of a pair management table T300.

We will now describe the pair management information T300. As mentioned earlier, in the primary storage system 1, the write data from the host 3 is generally stored in a plurality of logical volumes. For example, if the PDKC 11 receives a write request and a write data to be written to the logical volume V11 from the host 3, the write data is stored in the logical volume V11 in the PDKC 11 and the logical volume V12 in the LDKC 12. Further, the write data is also stored in the logical volume V21 in RDKC 21.

FIG. 4 illustrates a configuration of a pair management table T300. FIG. 4 illustrates a pair management table T300 managed by the PDKC 11. Information of one volume pair is stored in each row of the pair management table T300.

In the present specification, a pair composed of a P-VOL and an L-VOL (or R-VOL) to which the replica of the relevant P-VOL is written is called "volume pair". Further, the L-VOL (or R-VOL) storing the replica of a P-VOL is called a "volume in pair relationship with the P-VOL" or a "pair volume of the P-VOL". In contrast, the P-VOL serving as a logical volume storing the copy source data of an L-VOL is called a "volume in pair relationship with the L-VOL" or a "pair volume of the L-VOL". Further, the volume storing a replica of the P-VOL (which is either the L-VOL or the R-VOL) is sometimes generally referred to as a "secondary volume (S-VOL)".

Since data copy via synchronous copy process is performed between a P-VOL and an L-VOL which is a pair volume of the P-VOL, the pair of the P-VOL and the L-VOL serving as a pair volume of the P-VOL is sometimes referred to as synchronous copy pair. On the other hand, since data copy via asynchronous copy process is performed between the P-VOL and an R-VOL serving as a pair volume of the P-VOL, the pair of the P-VOL and the R-VOL serving as a pair volume of the P-VOL is sometimes referred to as asynchronous copy pair.

In the storage subsystem, an identifier called a pair number (Pair#) is assigned to each pair for management, and the pair number is stored in Pair# (T301). Information on the P-VOL belonging to the volume pair (PDKC# which is a serial number of the storage subsystem to which the P-VOL belongs, and the LDEV# of the P-VOL) is stored in PDKC# (T303) and P-VOL# (T304). Further, information on the S-VOL (that is, the S-VOL or the R-VOL) belonging to the volume pair (SDKC# which is an identification number capable of specifying the storage subsystem to which the S-VOL belongs, and the LDEV# of the S-VOL) is stored in SDKC# (T305) and S-VOL# (T306).

In the description of the present embodiment, the serial number of the LDKC 12 is set to 1, and the serial number of the RDKC 21 is set to 2. That is, in FIG. 4, the volume pair defined in the rows where the Pair# (T301) are 1 and 2 is a synchronous copy pair, and the volume pair defined in the rows where the Pair# (T301) are 3 and 4 is an asynchronous copy pair.

The state of a volume pair (pair status) is stored in Pair Status (T302). The pair status will be described in detail later. Further, Gr# (T307) is a column for storing the identification number of the group to which the volume pair belongs. A copy pointer T308 is information used by the PDKC 11 when performing an initial copy process (described later). The details of the copy pointer T308 will be described when describing the initial copy process.

We will now describe the pair status. Each volume pair takes one of the states described below. These states are called "pair status" in the present specification.

(a) Initial-Copy:

At first, in creating a volume pair, the PDKC 11 performs a process to copy all the contents of the P-VOL to the S-VOL (L-VOL, R-VOL) (called initial copy process). The state where this process is on-going is called "Initial-Copy" state.

(b) Duplex:

The state of a volume pair where the contents of the P-VOL and S-VOL have become identical via the initial copy process or a resynchronization process described later is called "Duplex" state.

(c) Suspend:

The state in which the contents of the P-VOL are not reflected in the S-VOL is called "Suspend" state. For example, in a state where the transmission line connecting the PDKC 11 and the LDKC 12 is cut off and copying becomes impossible, the volume pair becomes "Suspend" state. It is also possible that the volume pair becomes the "Suspend" state according to the instruction from a user. The process for setting a volume pair to "Suspend" state is called Suspend process.

(d) Duplex-Pending:

In a state where a volume pair is in a transitional state of transiting from the Suspend state to the Duplex state, the state of the volume pair is called "Duplex-Pending" state. When the volume pair which was in Suspend state is changed to this state, the data in the P-VOL (or the S-VOL) is copied to the S-VOL (or the P-VOL) in order to coincide (synchronize) the contents of the P-VOL and the S-VOL. At the point of time when the copying is completed, the state of the volume pair is changed to the "Duplex" state. The process for transiting the volume pair in the "Suspend" state to the Duplex state is called resynchronization process (resync process).

One of the four states described above is stored in Pair Status (T302) of the pair management table T300. If 0 is stored in Pair Status (T302), it means that the state of the volume pair is in "Initial-Copy state", and when 1 is stored therein, it means that the state of the volume pair is in "Duplex state". Moreover, if 2 is stored in Pair Status (T302), it means that the state of the volume pair is in "Suspend state", and if 3 is stored therein, it means that the state of the volume pair is in "Duplex-Pending state".

In the above description, it has been described that "Initial-Copy" and "Duplex-Pending" are different states. However, in a state where the volume pair is either in "Initial-Copy" or "Duplex-Pending" state, they correspond in that the contents of both P-VOL and S-VOL are synchronized. Therefore, the two states do not have to be managed differently, and they can be managed as the same state.

We will describe the synchronous pair# (T203) and the asynchronous pair# (T204) in the logical volume management table T200. If the logical volume specified by the LDEV# (T201) belongs to a synchronous volume pair, the pair number of the synchronous volume pair to which this logical volume belongs is stored in the synchronous pair# (T203). On the other hand, if the logical volume specified by the LDEV# (T201) belongs to an asynchronous volume pair, the pair number of the asynchronous volume pair to which this logical volume belongs is stored in the asynchronous pair# (T204).

As mentioned earlier, the data stored in the logical volume (P-VOL) of the PDKC 11 is stored in the logical volume (L-VOL) of the LDKC 12 via synchronous copy process. Further, the data stored in a certain logical volume (P-VOL) of the PDKC 11 is also stored in the logical volume (R-VOL) of the RDKC 21 via asynchronous copy process. In other words, the P-VOL belongs to a plurality of volume pairs. Therefore, if the logical volume specified by the LDEV# (T201) is a P-VOL, the pair number is stored in both the synchronous pair# (T203) and the asynchronous pair# (T204). Further, if the logical volume specified by the LDEV# (T201) is an L-VOL (corresponding to a case where the logical volume management table T200 is managed by the LDKC 12), the pair number is stored only in the synchronous pair# (T203), and an invalid value (NULL; value that is not used as LDEV#, such as −1) is stored in the asynchronous pair# (T204). When the logical volume specified by the LDEV# (T201) is an R-VOL, the pair number is stored only in the asynchronous pair# (T204), and an invalid value (NULL) is stored in the synchronous pair# (T203).

For example, it is assumed that the pair number of the volume pair composed of a P-VOL whose LDEV# (T201) is 1 and an L-VOL in pair relationship with this P-VOL (assuming that the LDEV# of this L-VOL is 0 and the serial number of the storage subsystem to which the L-VOL belongs is 1) is 1. In this case, 1 is stored in Pair# (T301) and 1 is stored in PVOL# (T304) of a certain row (row 311 in the case of FIG. 4) in the pair management table T300.

The pair number of the volume pair composed of a P-VOL whose LDEV # (T201) is 1 and an R-VOL in pair relationship with this P-VOL is assumed to be 3. In this case, 3 is stored in Pair# (T301) and 1 is stored in PVOL# (T304) of a certain row (row 313 in the case of FIG. 4) in the pair management table T300.

Further in this case, 1 is stored in synchronous pair# (T203) and 3 is stored in asynchronous pair# (T204) of the row where the information of P-VOL whose LDEV# (T201) is 1 is stored in the logical volume management table T200.

We will now describe the group management table. As described above, the order of updating data of the L-VOL or the R-VOL is controlled to be the same as the order of data update of the P-VOL. In the above description, an example is illustrated where there is one L-VOL and one R-VOL, but even in a case where there are a plurality of L-VOLs or R-VOLs, the order of data update is controlled similarly. In the storage system according to the present embodiment, the volume pairs that must keep the data update order is managed in units called "group". The group is also used to associate the journal volumes which are used for data copy with the volume pair for management. When the storage subsystem creates a journal, it specifies the journal volume for storing the created journal by referring to the group management table T400 and the pair management table T300.

FIG. 5 illustrates a configuration example of the group management table T400. The example illustrated in FIG. 5 is an example of the group management table T400 managed by the PDKC 11. In FIG. 5, the volume pairs having pair numbers 3 and 4 are managed as one group, and the identification number of this group is set to 2 (row (row 411) where Gr# (T401) is 2). Also, in JVOL# (T403), the LDEV# of the journal volume is stored which is used when performing asynchronous copy. A serial number of the storage subsystem in which the pair volume belongs and a group number to which the pair volume belongs are stored respectively in counter DKC# (T404) and Gr# (T405). Since the example of FIG. 5 is an example of the group management table T400 stored in the PDKC 11, the serial number of LDKC 11 or RDKC 21 is stored in the counter DKC# (T404). The Pair# (T402) of row 412 are 3 and 4, and they are a volume pair having a pair volume (R-VOL) in the RDKC 21. Therefore, the serial number of the RDKC 21 is stored in the counter DKC# (T404) of row 412. Further, since the volume pairs whose pair number is 3 or 4 belong to a group whose identification number is 2, "2" is stored in Gr# (T401) of the rows in the pair management table T300 where the Pair# (T301) are 3 and 4.

Further, the Pair# (T402) of row 411 is 1 and 2, and these are the volume pairs having pair volumes (L-VOLs) in the LDKC 12. Therefore, the serial number of the LDKC 12 is stored in the counter DKC# (T404) of row 411. Furthermore, since the volume pairs whose pair number is 1 or 2 belong to a group whose identification number is 1, "1" is stored in Gr# (T401) in rows in the pair management table T300 where the Pair# (T301) is 1 and 2. Further, synchronous copy process is performed to volume pairs having the pair volumes (L-VOLs) in the LDKC 12, and in this copy process, a process to transmit the data stored in the journal volume in the PDKC 11 to the LDKC 12 will not be performed (that is, the journal volume is not used). Therefore, an invalid value (NULL) is stored in the JVOL# (T403) in row 411.

(4) Creation of Journal

Next, we will describe the format of a journal. As described earlier, according to the storage system of the present embodiment, the PDKC 11 or the LDKC 12 creates a journal. In the following, the journal created by the PDKC 11 will mainly be described, but the journal created in the LDKC 12 is also similar to the journal described below. Journal includes additional information such as the SEQ#, in addition to the replica of the write data from the host 3. In the present embodiment, the replica of the write data stored in the journal is referred to as "journal data", and the additional information such as the SEQ# is referred to as "management information".

Figure 6:
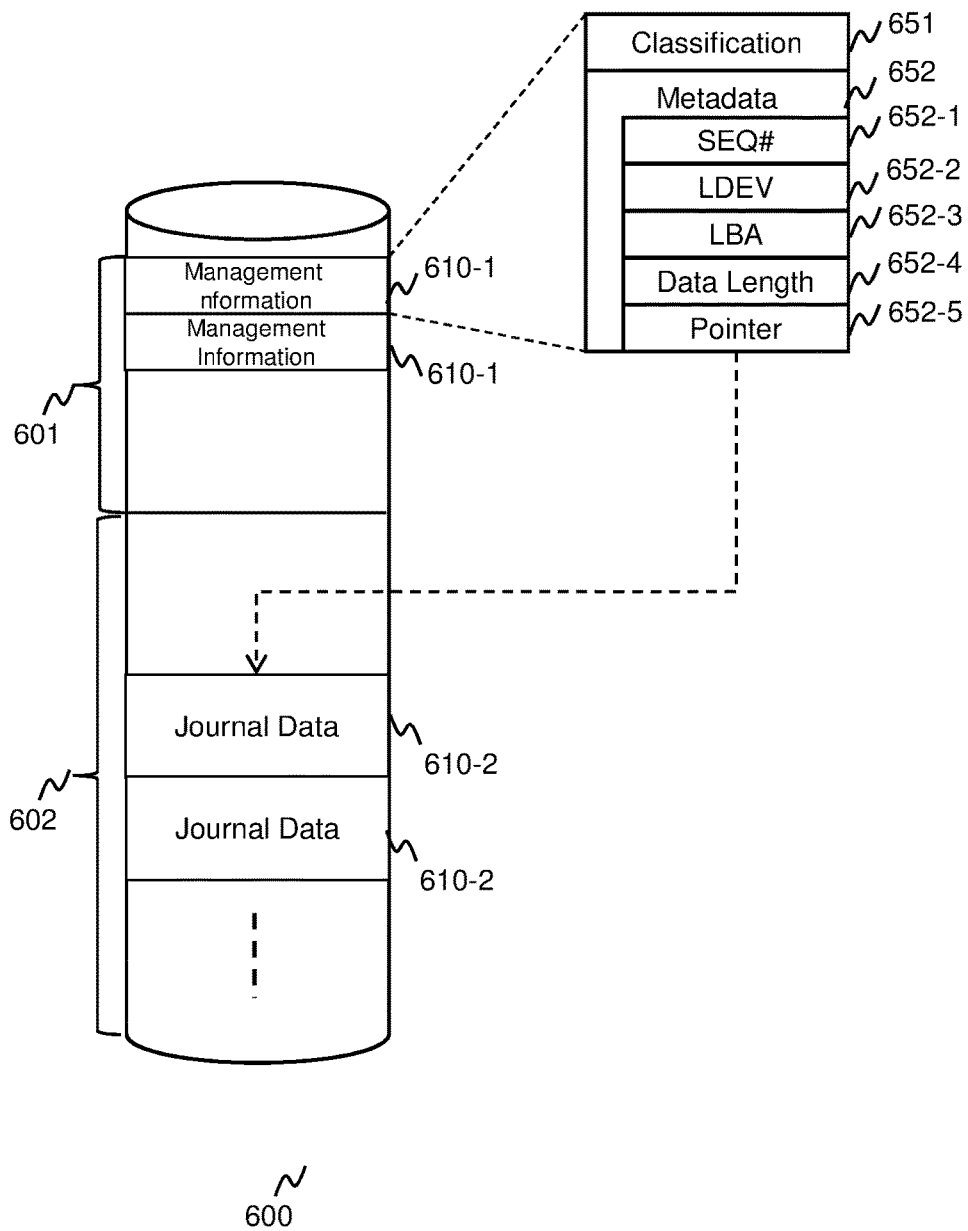
FIG. 6 is a view illustrating an outline of a journal structure.

In the storage system according to the present embodiment, in a state where a journal is stored in the journal volume, journal data 610-2 and management information 610-1 are stored separately, as shown in FIG. 6. The area storing the management information 610-1 is referred to as management information storage area 601, and the area storing the journal data 610-2 is referred to as journal data storage area 602.

The management information 610-1 is composed of a classification 651 and a metadata 652. Since some journals 610 may include information other than the journal data 610-2, the classification 651 is the information describing the contents thereof.

Different types of information are stored in the metadata 652, depending on the type designated by the classification 651. FIG. 6 illustrates a metadata of a case where the replica of write data from the host 3 is stored in the journal 610. In this case, SEQ# (652-1), LDEV# (652-2) and LBA (652-3) and data length (652-4) which are a set of information showing the write location of the write data, and a pointer (652-5) showing the stored location of the journal data in the journal volume, are stored in the metadata 652.

Since the SEQ# (652-1) has already been described, the description thereof is omitted. The LDEV# (652-2) is the information (logical volume number) specifying the P-VOL included in the write command received from the host 3. The LBA (652-3) and data length (652-4) are also the information included in the write command received from the host 3, and which are the information for specifying the extent for writing data in the P-VOL. The RDKC 21 receiving the journal 610 uses the information of the LDEV# (652-2) and LBA (652-3) and data length (652-4) to specify the R-VOL and the area within the R-VOL for reflecting the contents of the journal data 610-2. The pointer (652-5) is the information showing the storage location in the journal volume of the journal data 610-2 corresponding to the management information 610-1. LBA is used for example as information for showing the storage location.

Next, we will describe the classification 651. In the storage system according to the present embodiment, there are both a case where the journal data 610-2 is included in the journal and a case where it is not included therein. If the journal data 610-2 is included in the journal, this journal is referred to as a "normal journal". If the journal data 610-2 is not included in the journal, this journal is referred to as a "dummy journal". In the storage system according to the present embodiment, information showing whether the journal is a normal journal or a dummy journal is stored in the classification 651. In the following description, if 0 is stored in the classification 651, it means that a normal journal is stored, and if 1 is stored therein, it shows that a dummy journal is stored.

If the journal is a dummy journal (if 1 is stored in the classification 651), only SEQ #652-1 is included in the metadata 652 (actually, areas for storing LDEV #652-2 to pointer 652-5 exist, but valid values are not stored in these areas). When the RDKC 21 reads the journal from the journal volume to restore the journal, if the journal is a dummy journal, no operation will be performed. This is because the dummy journal does not include the journal data 610-2. The actual method of use of the dummy journal will be described later.

(5) SEQ# Management Information

As mentioned earlier, the SEQ# used by the storage subsystem to create a journal is a serial number. In order to include the serial number in the journal, information for managing the usable SEQ# (referred to as SEQ# management information) is maintained in the PDKC 11 and the LDKC 12.

The contents of the SEQ# management information will now be described with reference to FIG. 7. The SEQ# management information includes information of an SEQ# management table T800, an acquired SEQ# 810, a created SEQ# 811, a previously created SEQ# 813, and a previous time 813'.

The SEQ# management table T800 is a table having a list of SEQ #s that the storage subsystem can include in a journal. One SEQ# management table T800 is defined for one group (or journal volume). The PDKC 11 and the LDKC 12 respectively store the SEQ# management table T800 in their own SMs.

In the present embodiment, the minimum value that the storage system 1 can use as the SEQ# is 1, and the maximum value thereof is n (n is an integer of 2 or greater). Further, when the SEQ# is x (1≤x≤n), it is referred to as "SEQ #x". Further, the journal including SEQ #x (journal whose SEQ# (652-1) is x) is referred to as "journal #x".

As shown in FIG. 7, candidate SEQ# to be included in the journal (that is, a value of 1 or greater and n or smaller) is stored in a SEQ# (T801) field of each row of the SEQ# management table T800. An acquired bit (T802), a created bit (T803), a duplication ongoing bit (T804) and a not-created bit (T805) will be described later, but in the initial state, 0 is stored in the acquired bit (T802), the created bit (T803), the duplication-ongoing bit (T804) and the not-created bit (T805) of all rows. The SEQ# management information other than the SEQ# management table T800, which are the acquired SEQ# (810), the created SEQ# (811), the previously created SEQ# (813) and the previous time 813', will be described later, but in the initial state, 0 is stored in all fields.

As described earlier, among the plurality of storage subsystems, the PDKC 11 determines the SEQ# to be included in the journal. When creating a journal, in principle, the PDKC 11 determines (selects) the minimum SEQ# among the SEQ #s which has not yet been used for journal creation as the SEQ# to be included in the journal. In the present specification, this process is referred to as "acquisition of SEQ#". After performing the acquisition of SEQ#, the PDKC 11 creates the journal including the selected SEQ#.

The acquired bit (T802) in the SEQ# management table T800 and the acquired SEQ# (810) are used for an acquisition process of SEQ# and a journal creation process. In the following, the way how to use these management information when the PDKC 11 creates a journal will be described. When the PDKC 11 acquires an x-th (1≤x≤n) SEQ# (SEQ #x) by the acquisition of SEQ#, it sets the acquired bit (T802) of the row where the SEQ# (T801) is x among the rows of the SEQ# management table T800 to 1. Further, if a journal having SEQ# x (journal #x) was discarded, the acquired bit (T802) of the row where the SEQ# (T801) is x is set to 0. The case when journal #x was discarded is, for example, the case that the journal has already been transmitted from the PDKC 11 to the RDKC 21.

The SEQ# most recently acquired by the PDKC 11 is stored in the acquired SEQ# (810). When the PDKC 11 sets the acquired bit (T802) of the row where the SEQ# (T801) is x to 1 (that is, if the PDKC 11 has acquired SEQ #x), the acquired SEQ# (801) is set to x. By referring to the acquired SEQ# (801), the PDKC 11 can specify the SEQ# that can be acquired next (in other words, the SEQ# of "the acquired SEQ# (801)+1" can be acquired; if the acquired SEQ# (801) is a maximum value (n), the SEQ# that can be acquired next is 1 (minimum value of SEQ#)).

When the PDKC 11 creates journal #x and stores the same in the journal volume, it sets the created bit (T803) corresponding to the SEQ# included in journal #x to 1. That is, the created bit (T803) of the row where the SEQ# (T801) is x is set to 1. In the following description, the state of SEQ #x at this time is referred to as "journal created state". Moreover, when the journal is discarded, similar to the acquired bit (T802), the created bit (T803) corresponding to SEQ# included in that journal is set to 0.

In a state where abnormality has not occurred (when a situation such as a journal not being able to be created has not occurred), the created SEQ# (811) stores the SEQ# included in the most recently created journal in both the PDKC 11 and the LDKC 12. However, this is performed only on the condition that the journals equal to and smaller than the created SEQ# (811) are all set to the created state. How to update the value of the created SEQ# 811 will be described later.

The usage of the duplication ongoing bit (T804) and the not-created bit (T805) will be described later.

In the PDKC 11, the SEQ# is acquired in ascending order to create a journal, but as described above, the SEQ# included in the created journal may not always be successive. For example, a state as described with reference to FIG. 7 above, that is, a state where journals #1, #2 and #4 were already created but journal #3 has not yet been created, may occur. In that case, the following problem occurs. We will assume a state where journals #1, #2 and #4 were already created but journal #3 has not yet been created. In that case, even if journals #1, #2 and #4 were transferred to the RDKC 21, the RDKC 21 executes restoration of journals in accordance with the order of SEQ# (ascending order). Therefore, the restoration of journals of journal #4 and thereafter will not be executed until the journal #3 arrives at the RDKC 21 (the restoration of journals is interrupted).

Therefore, in PDKC 21, if the SEQ# is acquired but journal creation is interrupted, a journal not including journal data but including a SEQ# is created. The journal created here is the "dummy journal". As described in the above-described example, when journals #1, #2 and #4 were created but journal #3 has not been crated (such as when acquisition of SEQ #3 has been performed, but PDKC 11 has stopped creating journal #3 since an instruction to discontinue write processing has been received from the host 3), the PDKC 11 creates a journal #3 that does not include data. Specifically, it creates a journal where the information included in the management information 610-1 of the journal, which are the classification 651, the SEQ# (652-1) and the pointer 652-5, are "1", "3" and "NULL (invalid value)", respectively. In the following description, the process for creating a dummy journal using the acquired SEQ# is referred to as "dummying of journal" or "dummying of SEQ#".

The example of creating a journal in the PDKC 11 has been described above, but the journal is also created in the LDKC 12. In that case, the operation of the SEQ# management information similar to that described above is also performed in the LDKC 12. The process for creating a journal in the PDKC 11 or the LDKC 12 will be described in detail below.

(6) Flow of Write Processing

Figure 8:
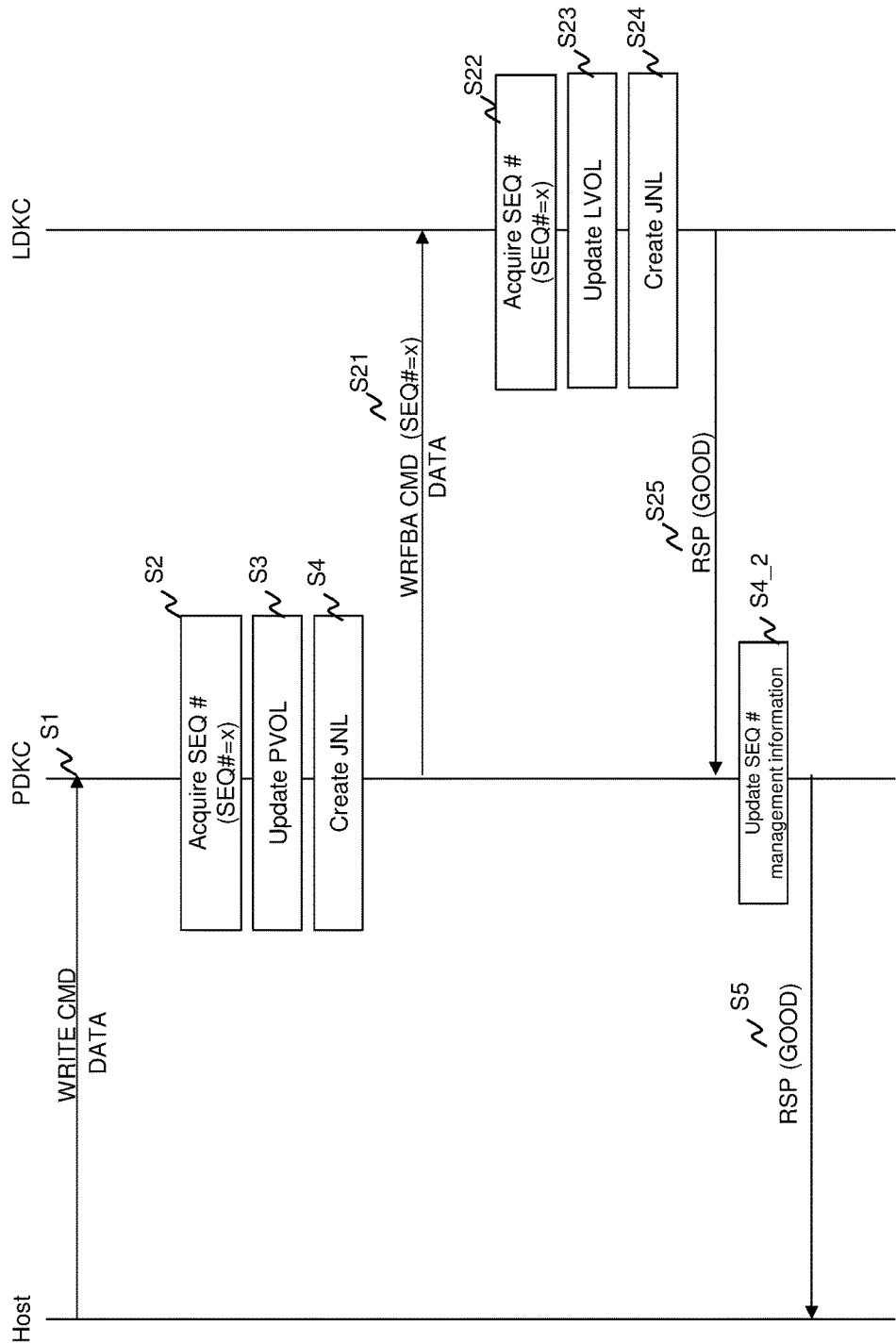
FIG. 8 is a view illustrating an overall flow of process performed when a PDKC receives a write request from a host.

FIG. 8 shows a flow of the process (write process) performed in the primary storage system 1 when a write request (write command) has been issued from the host 3 to the P-VOL in the PDKC. In the operation of this write process, journal creation is performed in the PDKC 11 and the LDKC 12.

This process is executed by the MP 141 in the PDKC 11 and the MP 141 in the LDKC 12. In the following description, the process performed by the MP 141 in the PDKC 11 is stated as being performed by "the PDKC 11". Further, the processing performed by the MP 141 in the LDKC 12 is stated as being performed by "the LDKC 12".

Figure 9:
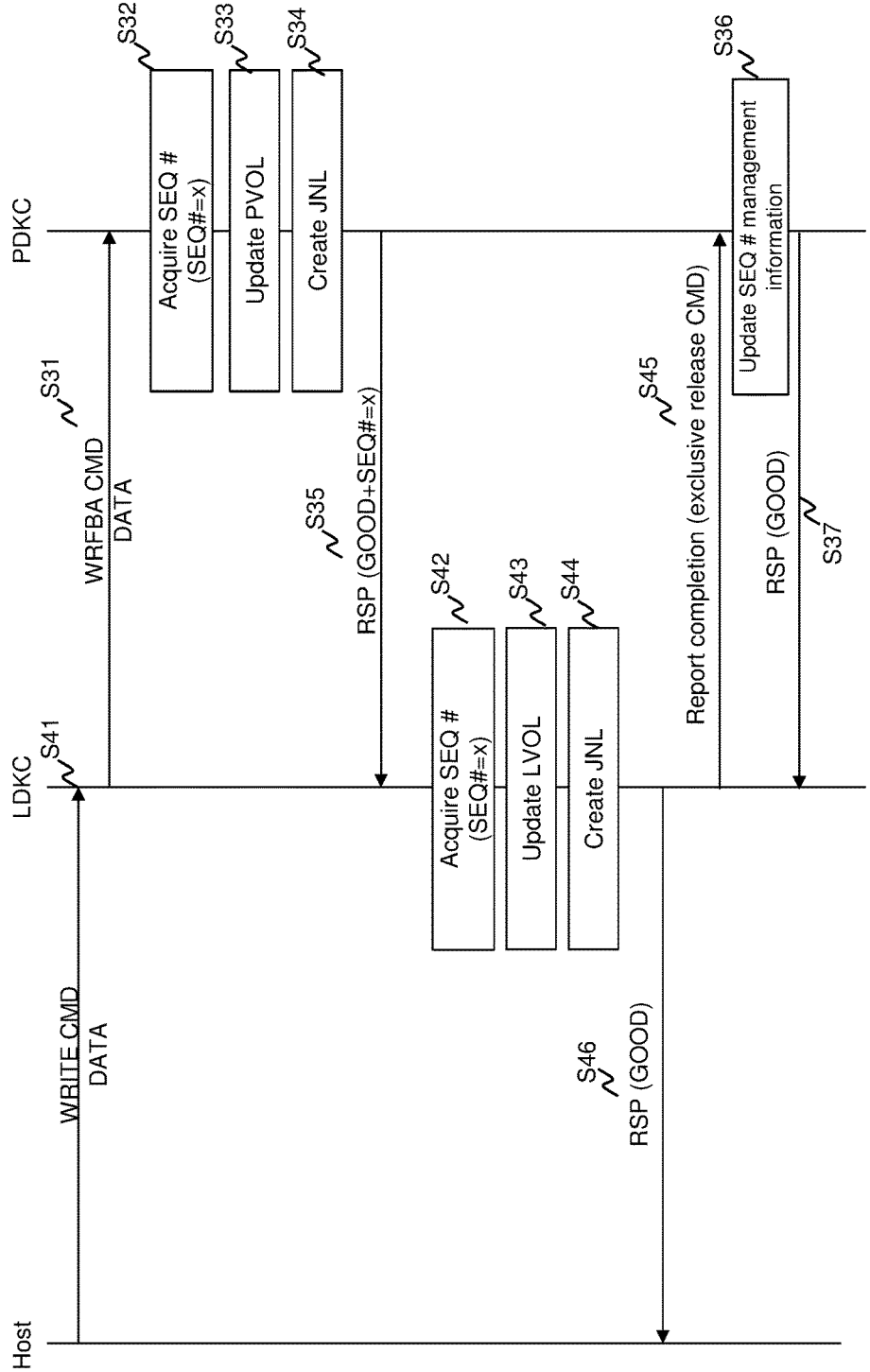
FIG. 9 is a view illustrating an overall flow of process performed when an LDKC receives a write request from the host.

When the PDKC 11 receives a write command and write data from the host 3 (S1), the PDKC 11 identifies the classification of the access target logical volume designated by the write command by referring to the logical volume management table T200 and the pair management table T300 described earlier. Specifically, it is determined whether the target is P-VOL or L-VOL. If the access target logical volume is P-VOL, the process described in FIG. 8 is performed. Further, if the access target logical volume is P-VOL, the identification of the journal volume which will be used in the subsequent journal creation is performed. However, the identification of the journal volume is not necessarily performed in S1, and should merely be performed before the journal is stored in the journal volume. If the access target logical volume is L-VOL, the process described in FIG. 9 is performed.

Now, with reference to FIG. 8, the process performed in a case where the access target logical volume is P-VOL will be described. The PDKC 11 acquires the SEQ# in S2. The process of S2 is as described above, wherein the PDKC 11 selects a row from the SEQ# management table T800 where the SEQ# (T801) is equal to the (acquired SEQ# 810+1). Then, the PDKC 11 sets the acquired bit (T802) and the duplication ongoing bit (T804) in the row to 1, and the created bit (T803) in the row to 0, and adds 1 to the acquired SEQ# 810. However, if the acquired SEQ# 810 has reached the maximum value (n), it selects the row where the SEQ# (T810) is 1, and thereafter, sets 1 to the acquired SEQ# 810. The update of the SEQ# management information will be described in detail later.

Thereafter, the PDKC 11 stores the write data to the P-VOL based on the contents designated by the write command (that is, information such as the LBA of the write destination logical volume) (S3). Thereafter, the PDKC 11 creates a journal including the write data and the SEQ# acquired in S2, and stores the same in the journal volume (S4). Also in S4, the PDKC 11 updates the SEQ# management information.

We will return to the description of FIG. 8. After S4, the PDKC 11 instructs the LDKC 12 to write the write data received in S1 to the L-VOL (and to create a journal in the LDKC 12) (S21). In the present embodiment, the command that the PDKC 11 uses to instruct to the LDKC 12 writing of write data to the L-VOL (and the creation of the journal in the LDKC 12) is referred to as "WRFBA command" to distinguish the command from a write command (command that the host 3 uses to instruct to the storage subsystem writing of data to the logical volume; for example, the command that the PDKC 11 receives from the host 3 in S1 of FIG. 8 is the write command).

Figure 11:
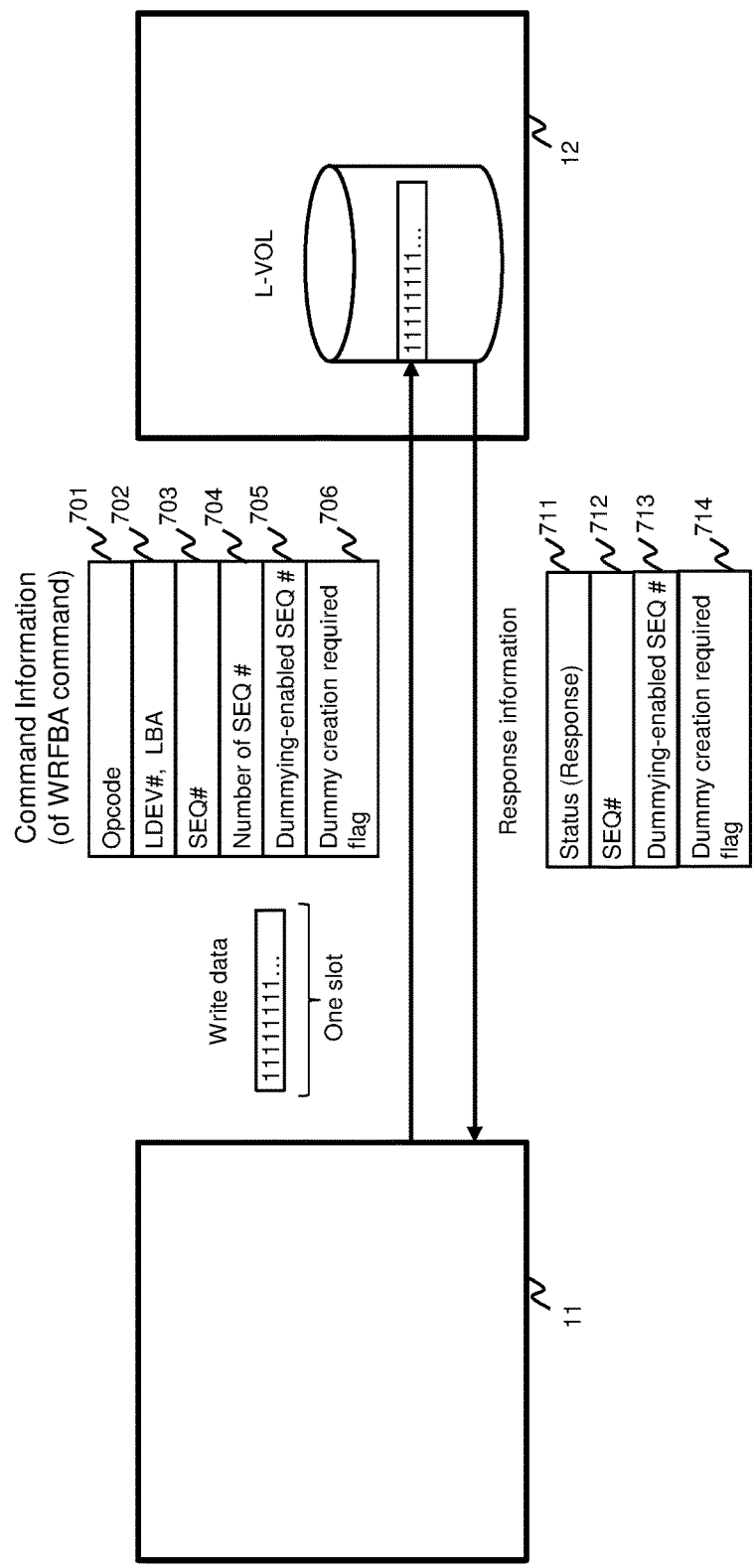
FIG. 11 is an explanatory view of a format of a WRFBA command.

The format of the WRFBA command is described with reference to FIG. 11. In a state where the WRFBA command is issued from the PDKC 11 to the LDKC 12 (or from the LDKC 12 to the PDKC 11), the command information and write data are transmitted. The command information includes information to be instructed to the command issue destination (such as the LDKC 12). The write data is data to be written to the logical volume.

The command information includes information of, at least, an operation code (Opcode) 701, an LDEV#/LBA (702), an SEQ# (703), a number of SEQ# (704), a dummying-enabled SEQ# (705), and a dummy creation required flag (706). The operation code (Opcode) 701 is information representing the command type, and in the present example, information indicating that it is a WRFBA command is stored. The LDEV# of the L-VOL being the write destination of the write data (or information capable of deriving the logical volume number) and the LBA in the L-VOL are stored in the LDEV#/LBA (702). References 701 and 702 are information similar to the information included in the write command. In the storage system according to the present embodiment, when the host 3 issues a write command designating the LDEV# of the P-VOL (or information capable of deriving the logical volume number) and the LBA in the P-VOL (assuming that the LBA (address) is X) to the PDKC 11, the PDKC 11 creates a WRFBA command storing the LDEV# of the L-VOL in pair relationship with the P-VOL and X (LBA in the L-VOL) in the LDEV#/LBA (702), and transmits the same to the LDKC 12. In contrast, when the host 3 issues a write request designating the LDEV# of the L-VOL (or information capable of deriving the logical volume number) and the LBA in the L-VOL (assuming that the LBA (address) is X) to the LDKC 12, the LDKC 11 creates a WRFBA command storing the LDEV# of the P-VOL in pair relationship with the L-VOL and X (LBA in the P-VOL) in the LDEV#/LBA (702), and transmits the same to the PDKC 12.

The SEQ# (703) and the number of SEQ# (704) are used for transmitting information related to the SEQ# to the LDKC 12 using the WRFBA command. In a state where the PDKC 11 issues a WRFBA command to the LDKC 12, the PDKC 11 creates a WRFBA command (command information) storing the SEQ# to the SEQ# (703). A plurality of SEQ #s can be stored in the SEQ# (703). The number of SEQ #s stored in the SEQ# (703) is stored in the number of SEQ# (704). Further, in a state where the LDKC 12 issues a WRFBA command to the PDKC 11, no value is stored in the SEQ# (703) (an invalid value is stored; or the PDKC 11 ignores the value stored in the SEQ# (703)). This is because the PDKC 11 determines the SEQ# to be acquired. When the PDKC 11 receives a WRFBA command from the LDKC 11, it acquires the same number of SEQ #s stored in the number of SEQ# (704).

The dummying-enabled SEQ# (705) and the dummy creation required flag (706) are used when creating the dummy journal. The details of these information will be described later.

In S21, the PDKC 11 stores the same SEQ# as the SEQ# selected in S2 to the SEQ# (703) of the command information, creates a WRFBA command storing 1 in the number of SEQ# (704), and transmits the same to the LDKC 12.

In S21, the LDKC 12 having received the WRFBA command acquires the same SEQ# as the SEQ# (703) included in this command from the SEQ# management table T800 (S22). Here, the same number of SEQ #s are acquired as the number of SEQ# (704) included in the WRFBA command. However, in the following description, unless stated otherwise, an example is described where the number of SEQ# (704) included in the WRFBA command received in S21 is 1.

Similar to the PDKC 11, the LDKC 12 also has SEQ# management information, such as the SEQ# management table T800. Further, similar to the PDKC 11, the LDKC 12 also performs a process to identify the classification of the access target logical volume designated in the command by referring to the logical volume management table T200 and the pair management table T300 when a command (WRFBA) is received.

As mentioned earlier, the SEQ# to be included in the journal is determined by the PDKC 11. Therefore, in S22, the LDKC 12 acquires the SEQ# included in the WRFBA command received in S21. The details of the method for updating the SEQ# management information at this time will be described in detail later.

After S22, the LDKC 12 writes the write data to the L-VOL (S23), and creates a journal (S24). In S24, similar to S4, the SEQ# management information is updated. Incidentally, when the PDKC 11 (or the LDKC 12) receives a write request of data having a longer size than a given length (one example of which is 128 KB) from the host 3, the PDKC 11 (or the LDKC 12) issues WRFBA commands for a plurality of times to the LDKC 12 (or the PDKC 11) so as to divide and transmit the data at multiple timings. For example, when the PDKC 11 receives a write request of write data of 256 KB from the host 3, the PDKC 11 issues two WRFBA commands for transmitting 128 KB data to the LDKC 12. However, two SEQ# are stored in the SEQ# (703) included in the WRFBA command issued first, and 2 is stored in the number of SEQ# (704). Therefore, the LDKC 12 acquires two SEQ# at the point of time when the first WRFBA command is received. However, there is only one journal created by the journal creation process performed after the acquisition of SEQ# (for example, journal creation is performed in S24 after acquiring two SEQ# in S22 of FIG. 8, but only the journal including the 128 KB data received together with the first WRFBA command is created here; the second journal is created at a point of time when the second WRFBA command is received).

After creating the journal, the LDKC 12 returns the response information to the PDKC 11 (S25). An example of the response information is illustrated in FIG. 11. The response information that the storage subsystem according to the present embodiment returns to the command issue source (which may be the host 3 in some cases, or the storage subsystem such as the PDKC 11 in other cases) includes information of a Status (also referred to as Response) 711, an SEQ# 712, a dummying-enabled SEQ# 713, and a dummy creation required flag (714). The Status 711 stores information showing whether the process related to the command received from the command issue source has been completed normally or completed abnormally. When Good (also referred to as Good Response) is stored, it means that the process has ended normally. When Check Condition is stored, it means that the process has not ended normally. The SEQ# 712, the dummying-enabled SEQ# 713 and the dummy creation required flag (714) will be described later.

In S25, the LDKC 12 returns GOOD as the Status 711 to the PDKC 11. The PDKC 11 having received GOOD as the status 711 from the LDKC 12 updates the SEQ# management information (S4_2), returns GOOD as the Status 711 to the host 3 (S5), and ends the write process. The details of update of the SEQ# management information performed in S4_2 will be described later.

FIG. 9 illustrates a flow of the process performed in the primary storage system 1 when a write request (write command) is issued from the host to the L-VOL in the LDKC. This process is also performed in the MP 141 of the PDKC 11 and the MP 141 of the LDKC 12.

When the LDKC 12 receives a write command and write data from the host 3 (S41), the LDKC 12 identifies the classification of the access target volume designated by the write command, as described earlier. Hereafter, we will describe a case where the access target volume is an L-VOL. By issuing a WRFBA command to the PDKC 11, the LDKC 12 instructs the PDKC 11 to write the write data to the P-VOL (and to create a journal) (S31). The PDKC 11 having received the WRFBA command acquires the SEQ# (S32), stores the write data to the P-VOL (S33), and creates a journal including the SEQ# acquired in S32 (S34). The processes performed in S32 to S34 are substantially similar to S2 to S4 of FIG. 8. However, as described earlier, the SEQ# of the WRFBA command received by the PDKC 11 in S31 does not include a valid value, and in S32, the PDKC 11 acquires the same number of SEQ #s as the number designated in the number of SEQ# (704). The method for determining the SEQ# to be acquired is the same as S2 of FIG. 8.

After S34, the PDKC 11 returns a response information (GOOD) stating that the process in the PDKC 11 has been completed normally to the LDKC 12 (S35). Here, when the PDKC 11 returns a response information to the LDKC 12, the PDKC 11 creates a response information including the SEQ# stored in the journal in S34 (equivalent to the SEQ# acquired in S32) in the SEQ# 712, and returns the same to the LDKC 12. In the LDKC 12, a journal is created using the value included in the SEQ# 712 (S42 to S44).

The processes of S42 to S44 will be described in detail. The LDKC 12 having received the response information from the PKDC 11 in S35 acquires the same SEQ# as the SEQ# included in the response information from the SEQ# management table T800 (S42). Similar to S22, the SEQ# management information, such as the acquired bit (T802) and the acquired SEQ# (810), are also updated.

Thereafter, the LDKC 12 writes the write data to the L-VOL (S43), and creates a journal (S44). In S44, similar to S24, the values of the created bit (T803) and the created SEQ# 811 are updated. After S44, the LDKC 12 returns a Good Response to the host 3 (S46), and notifies the PDKC 11 that journal creation has been completed (S45). In response, the PDKC 11 releases the physical resources used for storing the write data and creating journals, and updates the SEQ# management information (S36). The method for updating the SEQ# management information performed in S36 will be described in detail later.

Thereafter, the PDKC 11 returns a GOOD response to the LDKC 12 (S37). The LDKC 12 having received a GOOD response from the PDKC 11 ends the write process.

Now, we will describe the method for updating the SEQ# management information performed in FIGS. 8 and 9. The following description describes the way to update respective bits (acquired bit (T802) to not-created bit (T805)) of the row where the SEQ# (T801) is x (1≤x≤n) in the SEQ# management table T800, but unless stated otherwise, the statement that "the acquired bit (T802) is set to 1 (or 0)" means that the acquired bit (T802) of the rows where the SEQ# (T801) is x (1≤x≤n) in the SEQ# management table T800 is set to 1 (or 0). A similar description is used to refer to the setting of the created bit (T803), the duplication ongoing bit (T804) and the not-created bit (T805).

As described above, the PDKC 11 and the LDKC 12 acquire the SEQ# before creating a journal, and thereafter, create a journal using the acquired SEQ#. The respective bits of the SEQ# management table T800 (acquired bit (T802) to not-created bit (T805)) are provided so that the PDKC 11 (or the LDKC 12) can check the state of use of the respective SEQ# later.

At first, the acquired bit (T802), the created bit (T803) and the not-created bit (T805) are described. The acquired bit (T802) is information showing whether the SEQ# is already acquired or not. Therefore, at the point of time when the acquisition of SEQ# is performed (S2 or S22 in FIG. 8, or S32 or S42 is FIG. 9), the acquired bit (T802) is set to 1.

The created bit (T803) is information showing whether the creation of the journal including SEQ #x has been completed or not. Therefore, at the point of time when journal creation is completed (at the point of time when the process of S4 or S24 in FIG. 8 or S34 or S44 in FIG. 9 is completed), the created bit (T803) is set to 1.

The not-created bit (T805) is information showing that the SEQ #x has been acquired, but that the WRFBA command has not yet been received. As mentioned earlier, the value of the number of SEQ# (704) included in the WRFBA command received by the PDKC 11 or the LDKC 12 may be 2 or greater. In that case, during journal creation performed immediately after acquiring the SEQ#, only a journal including one SEQ# among the two or more of the acquired SEQ# is created. Then, the journals including the other SEQ #s are created at a point of time when the WRFBA command is received again from the PDKC 11 or the LDKC 12. The not-created bit (T805) is set for such SEQ#. For example, in S22 to S24 of FIG. 8, if two SEQ #s are acquired, the not-created bit (T805) for one SEQ# (SEQ# whose journal is created in S24) is set to 0. However, the not-created bit (T805) of the other SEQ# is set to 1. The not-created bit (T805) set to the other SEQ# will be changed to 0 when a WRFBA command is received from the PDKC 11.

The duplication ongoing bit (T804) is information used only by the PDKC 11 (not used by the LDKC 12). The duplication ongoing bit (T804) is information showing whether a journal including SEQ #x is stored in both the PDKC 11 and the LDKC 12 (subjected to duplex writing) or not. In the present specification, the creation of a journal including the same SEQ# (such as journal #x) in both the PDKC 11 and the LDKC 12 is described that "a journal has been duplexed". At first, at a point of time when the SEQ# is acquired (such as S2 of FIG. 8), the duplication ongoing bit (T804) is set to 1. At a point of time when the journal is created in the PDKC 11 (S4 of FIG. 8), the duplication ongoing bit (T804) is still 1. This is because a journal is not created in the LDKC 12 at the point of time when a journal is created in the PDKC 11 (S4 of FIG. 8). Only at the point of time when the journal is created in the LDKC 12 (S24 of FIG. 8) and a notice stating that the journal creation is completed is received (S25 of FIG. 8, or S45 of FIG. 9), the duplication ongoing bit (T804) is changed to 0.

Also, when the PDKC 11 or the LDKC 12 has resigned duplexing of the journal (normal journal), it creates a dummy journal instead, although the details will be described later. The PDKC 11 changes the duplication ongoing bit (T804) corresponding to the SEQ# included in the journal into 0 not only when the normal journal is created both in the PDKC 11 and the LDKC 12, but also when the journal created in the PDKC 11 or the LDKC 12 is a dummy journal.

One example of the method for updating the value of the created SEQ# 811 will be described with reference to FIG. 10. The update of the created SEQ# 811 is performed when journal creation is performed (S4 and S24 of FIG. 8, S34 and S44 of FIG. 9) and in S4_2 of FIG. 8 and S36 of FIG. 9.

As described earlier, all the journals including the SEQ# equal to or smaller than the created SEQ# 811 are in a state where duplication is completed (or, as a result of resigning duplication, a dummy journal has been created). The following describes a case where the value of the created SEQ# 811 before update is a, and the value of the acquired SEQ# 810 is b (where a<b).

At first, the method for updating the value of the created SEQ# 811 performed in the PDKC 11 will be described. In S1001, the PDKC 11 prepares a variable c, and substitutes a value (a+1) for c (in other words, (the value of created SEQ# 811 at the current point of time+1) is substituted for c). Thereafter, regarding the row where the SEQ# (T801) is c, the PDKC 11 checks the values of the created bit (T803) and the duplication ongoing bit (T804) (S1002). As a result of the check, if the created bit (T803) of that row is 1 and the duplication ongoing bit (T804) is 0 (S1003: Y), it means that the journal whose SEQ# is c (journal #c) is already created in both the PDKC 11 and the LDKC 12. Therefore, in that case, the PDKC 11 substitutes the value of variable c for the created SEQ# 811 (S1004). On the other hand, if the created bit (T803) of that row (row where the SEQ# (T801) is c) is 0 or if the duplication ongoing bit (T804) is 1 (S1003: N), the process is ended.

After S1004, the PDKC 11 adds 1 to c (S1005), and determines whether c is equal to or smaller than b or not. If c is greater than b (S1006: N), the process is ended. If c is equal to or smaller than b (S1006: Y), the PDKC 11 repeats the processes of S1002 and thereafter. As a result of executing the above processes, the maximum SEQ# of the journal created without fail in both the PDKC 11 and the LDKC 12 will be stored in the created SEQ# 811 (in other words, all the SEQ #s equal to or smaller than the created SEQ# are in the state where journals have been created).

The above description has described the flow of update process of the value of the created SEQ# 811 performed in the PDKC 11. Next, we will describe the method for updating the value of the created SEQ# 811 performed in the LDKC 12. However, only a part of the method for updating the value of the created SEQ# 811 performed in the LDKC 12 differs from the flow of process illustrated in FIG. 10, and the other steps are the same. Therefore, only the difference will be described below.

Figure 10:
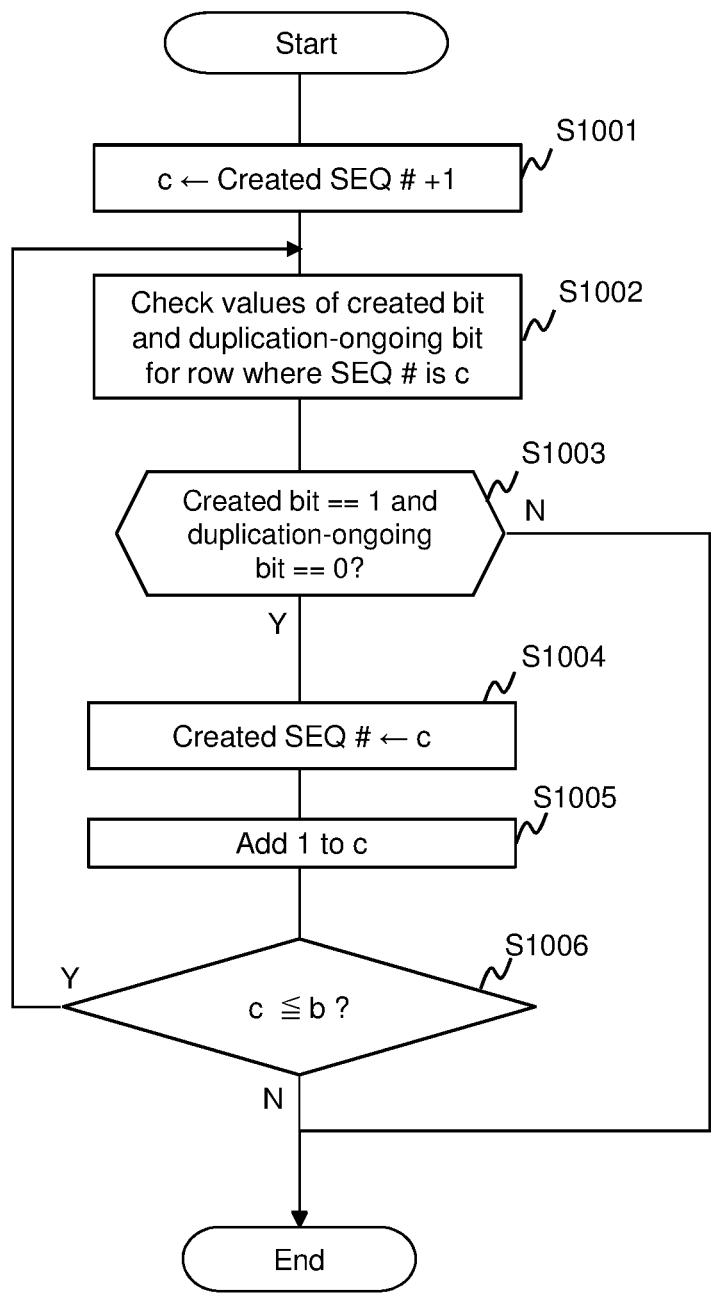
FIG. 10 is a view illustrating one example of a method for updating a created SEQ#.

In S1002 and S1003 of FIG. 10, the process of checking the values of the created bit (T803) and the duplication ongoing bit (T804) is performed for the row where the SEQ# (T801) is c. When the LDKC 12 performs the update of the value of the created SEQ# 811, it doesn't check the value of the duplication ongoing bit (T804). The other points are the same as the process described above.

The reason why the LDKC 11 does not check the value of the duplication ongoing bit (T804) is that the LDKC 12 does not refer to and update the duplication ongoing bit (T804). When the LDKC 12 creates journal #c, the journal #c has been already created in the PDKC 11 (it may include a case where the journal #c is a dummy journal). Therefore, in the LDKC 12, it is possible to determine whether journals #c are in the created state in both the PDKC 11 and the LDKC 12 by simply checking the content of the created bit (T803), so that the LDKC 12 will not refer to and update the duplication ongoing bit (T804).

(7) Dummying Process (PDKC)

Next, we will describe the dummying process. During normal operation, for example when a write request from the host 3 is processed in the primary storage system 1, if interruption of the process is instructed from the host 3, or if the process in the MP 141 or the communication between the PDKC 11 and the LDKC 12 is discontinued or delayed due to some reason, the creation of the journal including the acquired SEQ# may be stopped even after the SEQ# had been acquired. Dummying is executed in such case. An example is described of a case where the PDKC 11 receives a write request from the host 3 at first, but while executing the process related to the write request, the creation of the journal is stopped.

Figure 12:
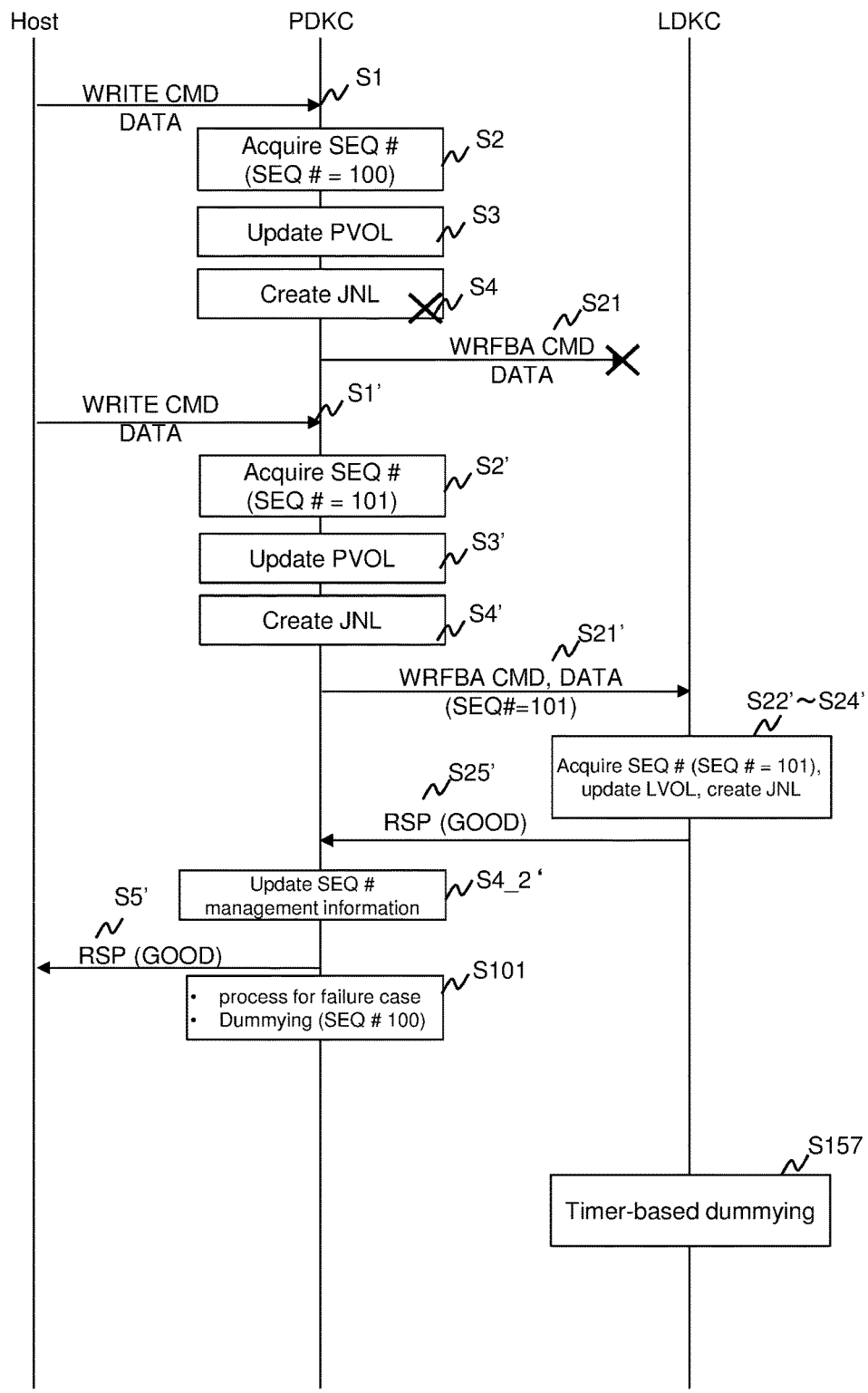
FIG. 12 is a view illustrating an overall flow of process performed during abnormality.

FIG. 12 illustrates an example of a case where the transmission of the WRFBA command from the PDKC 11 to the LDKC 12, which was to be performed after S4 (creation of the journal in the PDKC 11), has failed (or delayed). In FIG. 12, S1 to S4 are the same as those described in FIG. 8. During acquisition of the SEQ# performed in the process of S1 to S4, it is assumed that SEQ #100 is acquired (S2). Further in this example, it is assumed that SEQ #1 to SEQ #99 have already been acquired, and journals (journals #1 to #99) have been created.

In the example of FIG. 12, since the WRFBA command does not reach the LDKC 12, the processes of S22 to S25 of FIG. 8 will not be performed. However, it is assumed that the PDKC 11 is in a state capable of continuing operation. In this case, the MP 141 of the PDKC 11 detects somewhat later that the process related to the write request received in S1 is not completed, and performs necessary processes (S101). The process of S101 will be described later.

After the failure (or delay) of S21, the PDKC 11 may receive (S1') a write request different from the write request received in S1 from the host 3, and the process thereof may end normally (S2' to S5'). During the time when the process of S1' to S5' is performed, the acquisition of SEQ# is performed, but since SEQ #100 is acquired in S2, the PDKC 11 acquires the SEQ# 101 in S2'. Then, the PDKC 11 creates a journal #101 (S4'), and transmits a WRFBA command including value 101 in the SEQ# (703) to the LDKC 12 (521). The same process as S22 to S24 of FIG. 8 is performed in the LDKC 12, and here, SEQ #101 is acquired and journal #101 is created.

In this case, the LDKC 12 is in a state where journal #101 has been created but journal #100 (normal journal) cannot be created (a state where journal #100 is missing). If it is determined that a normal journal including a certain SEQ# (which in this example is the SEQ #100) cannot be created, the LDKC 12 resigns creation of a normal journal (which in this example is the journal #100), and performs dummying of the SEQ #100 (S157). The dummying process performed in S157 will be described with reference to FIG. 13. This is a periodically executed process, and it is referred to as "timer-based dummying".

(7-1) Timer-based Dummying

Before describing FIG. 13, the management information used in the process of FIG. 13 (timer-based dummying), which are the previously created SEQ# (813) and the previous time (813'), will be described. In timer-based dummying, a process to store the content of the created SEQ# (811) in the previously created SEQ# (813) is performed. Thereby, the PDKC 11 can recognize whether or not the current created SEQ# (811) has been changed from the point of time when the previous timer-based dummying had been executed. The previous time (813') will be described in the following. The initial values of the previously created SEQ# (813) and the previous time (813') are 0.

At first, the MP 141 compares the created SEQ# 811 with the previously created SEQ# 813, and determines whether the created SEQ# 811 has been updated or not (S201). If the created SEQ# 811 and the previously created SEQ# 813 have different values, it can be determined that the created SEQ# 811 has been updated. If the values of the created SEQ# 811 and the previously created SEQ# 813 differ (S201: Y), the MP 141 stores the value of the created SEQ# (811) in the previously created SEQ# (813), also stores the current time (time in which the determination of S201 has been performed) (S205), and ends this process.

Thereafter, the MP 141 determines whether or not a predetermined time (20 seconds, for example; hereafter, this time is referred to as "journal duplication timeout time") has elapsed from the time when the created SEQ# 811 has been checked by previous execution of this process (S202). This can be determined by checking whether the difference between current time and previous time 813' is equal to or greater than the journal duplication timeout time. If the journal duplication timeout time has elapsed (S202: Y), dummying is performed (S203).

The dummying of S203 will be described in further detail. FIG. 14 illustrates an example of the contents of the SEQ# management information managed by the LDKC 12 at a point of time when S24' of FIG. 12 has ended (at a point of time when the process related to the write request (S1') received from the host 3 had been completed). At the point of time when S24' had ended, the LDKC 12 is in a state where journals #1 to #99 and journal #101 are created. Therefore, the acquired bit (T802) and the created bit (T803) of the rows where the SEQ# (T801) is 99 and 101 are both 1. However, as for the row where the SEQ# (T801) is 100, the acquired bit (T802) is 0 and the created bit (T803) is 0. This is because the WRFBA command by the process of S21 had not been received and journal #100 had not been created.

In the process of S203, the SEQ# in a state similar to SEQ #100 is specified, and dummied. The SEQ# management information is used for this purpose. Specifically, the SEQ# (T801) corresponding to the conditions described below among the rows within the SEQ# management table T800 where the SEQ# (T801) is equal to or greater than the created SEQ# (811) (or greater than the created SEQ# (811)) and equal to or smaller than the acquired SEQ# is specified.

(a) The acquired bit (T802) is 0, and the created bit (T803) is 0

(b) The acquired bit (T802) is 1, the created bit (T803) is 0, and the not-created bit (T805) is 1

Condition (a) shows the state of the SEQ #100 at the point of time when S24' of FIG. 12 is ended. In the process of FIG. 12, the SEQ #100 is neither acquired nor journal-created. Condition (b) is a condition for specifying the SEQ# whose SEQ# had already been acquired but the journal is not created. However, other processes (such as the process of journal creation) are being executed in the LDKC 12 in parallel with the timer-based dummying. Therefore, it is possible that a WRFBA command arrives from the PDKC 11 during execution of S203, and in response thereto, the LDKC 12 creates a journal using the acquired SEQ#. Since the SEQ# in such state cannot be dummied, in S203, only the SEQ# whose not-created bit (T805) is 1 is specified among the SEQ #s whose acquired bit (T802) is 1 and the created bit (T803) is 0.

Figures 13, 14:
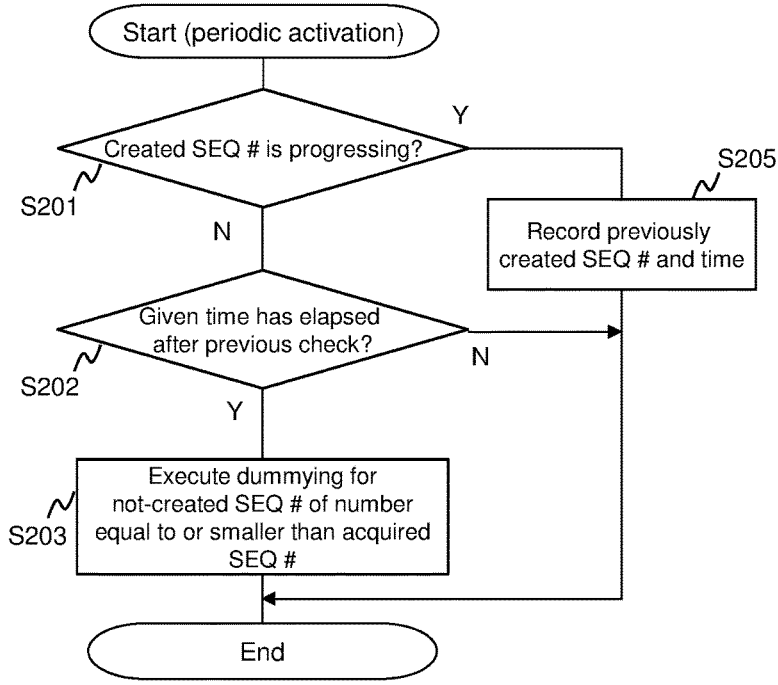
FIG. 13 is a view illustrating a flow of a dummying process executed periodically.
FIG. 14 is a view illustrating one example of a content of SEQ# management information.

In the example of FIG. 14, the row where the SEQ# (T801) is 100 corresponds to the above-described condition (a). Therefore, dummying (creation of dummy journal) of SEQ #100 is performed. Incidentally, in the example of FIG. 14, dummying is performed only for SEQ #100, but if a plurality of rows corresponding to the above conditions (a) or (b) exist (that is, if a plurality of SEQ# corresponding to above-condition (a) or (b) are specified), dummying is performed for the specified plurality of SEQ #s.

The dummying of SEQ #100 will now be described. In this case, the LDKC 12 creates a metadata 652 including 100 as the SEQ# (652-1) and 1 as the classification 651 (which is the creation of the dummy journal), and stores the same in the management information storage area 601 in the journal volume. After creating a dummy journal, the LDKC 12 updates the SEQ# management information. Specifically, it updates the information to indicate that journal #100 has been created. Therefore, the LDKC 12 sets the acquired bit (T802) and the created bit (T803) of the row where the SEQ# (T801) is 100 to 1, and sets the other bits to 0. Further, by performing the process of FIG. 10, the LDKC 12 updates the created SEQ# (811). By performing the process of FIG. 10 performed, the created SEQ# (811) is changed to 101. The reason for this is that at this point of time, in the LDKC 12, all the journals including the sequence number of SEQ #101 and younger are in the created state successively (without any missing numbers).

We will briefly explain the reason why dummying is performed after confirming that the created SEQ# 811 has not changed even after the journal duplication timeout time had elapsed in timer-based dummying. The reason for this is because the storage subsystem that executes the journal creation by receiving the WRFBA command (the LDKC 12 in the example of FIG. 12) cannot determine whether dummying should be performed or not.

In the example of FIG. 12, an example is described of a case where the WRFBA command (including SEQ #100) transmitting the write data received in S1 does not arrive at the LDKC 12. For example, when the PDKC 11 resigns transmission of the WRFBA command including the SEQ #100 to the LDKC 12, or when the transmission process of the WRFBA command is simply delayed due to some cause (such as delay of allocation of physical resources to be used when executing the process, or heavy traffic of the communication path between the PDKC 11 and the LDKC 12), the WRFBA command does not arrive at the LDKC 12.

The former case corresponds to the case, for example, for receiving an instruction to discontinue the process related to the write request received from the host 3 in S1. In that case, since the PDKC 11 stops (resigns) duplication of the write data and duplication of the normal journal (transmission of WRFBA command including the SEQ# to the LDKC 12), the creation of the journal including this SEQ# will not succeed, no matter how long the LDKC 12 waits. Therefore, it is preferable that the SEQ #100 is dummied at an early stage.

On the other hand, in the latter case, the WRFBA command may reach the LDKC 12 (at a delayed timing). In this case, the LDKC 12 will be able to create the normal journal if it waits for the arrival of the WRFBA command, therefore it is not preferable to perform dummying of the SEQ #100.

However, the LDKC 12 cannot determine whether the PDKC 11 has resigned creation of the journal including SEQ #100, or the transmission of the WRFBA command including SEQ #100 had simply been delayed. Therefore, the LDKC 12 performs dummying after confirming that the created SEQ# (811) has not been changed for a certain period of time (journal duplication timeout time). The details will be described later, but the timer-based dummying is also performed similarly in the PDKC 11.

If the journal duplication timeout time is too short, it will result in a large number of cases where, after dummying of the SEQ# is performed, the WRFBA command including the SEQ# arrives (in a delayed manner) to the LDKC 12. After dummying has been performed, a normal journal using the SEQ# included in the dummy journal cannot be created. Therefore, the PDKC 11 (or the LDKC 12) will return an error (CHECK CONDITION) to the host 3 as response information to the received write request. This is not preferable since an error is returned even when the process of the write request could have been processed normally. Therefore, it is preferable for the journal duplication timeout time to be set to a certain length or greater. Hereafter, we will describe one example of the method for setting the journal duplication timeout time.

Generally, if response information regarding a write request is not returned for a predetermined time after the host 3 issues the write request to the PDKC 11, the host 3 determines that the process regarding the relevant write request has failed. This predetermined time is referred to as "host timeout time". If the PDKC 11 cannot complete the process regarding the write request received from the host 3 (duplication of write data (storing of data to P-VOL and L-VOL), duplication of a normal journal, and so on) within the host timeout time, it resigns the process regarding the write request. By considering it, if the journal duplication timeout time is set longer than the host timeout time, the possibility of occurrence of a situation where the WRFBA command arrives (in a delayed manner) to the LDKC 12 after the SEQ# had been dummied by timer-based dummying is lowered. Therefore, it is preferable that the journal duplication timeout time is set to a value at least satisfying the following relationship:

journal duplication timeout time>host timeout time (7-2) Command-based Dummying

In timer-based dummying, dummying is performed when it has been detected that the created SEQ# 811 has not changed for a predetermined period of time. In that case, when a large amount of write requests have been received within that predetermined period of time, the SEQ #s that were acquired but have not been used for creating journals cannot be used. If a large amount of write requests are received within the predetermined period of time, a large amount of SEQ #s will be acquired and the usable SEQ #s (unacquired SEQ #s) will be depleted, and the LDKC 12 may not be able to create journals. Therefore, if there is a SEQ# having resigned duplexing of journal, it is preferable that the SEQ# is dummied at an early stage.

The storage subsystem according to the present embodiment copes with this demand by transmitting information capable of specifying the SEQ# having resigned duplexing of the journal (in other words, the SEQ# that can be dummied) from the PDKC 11 to the LDKC 12. This is described with reference to FIG. 15. The flow of the process illustrated in FIG. 15 is the same as that illustrated in FIG. 12 up to S5'.

Figure 15:
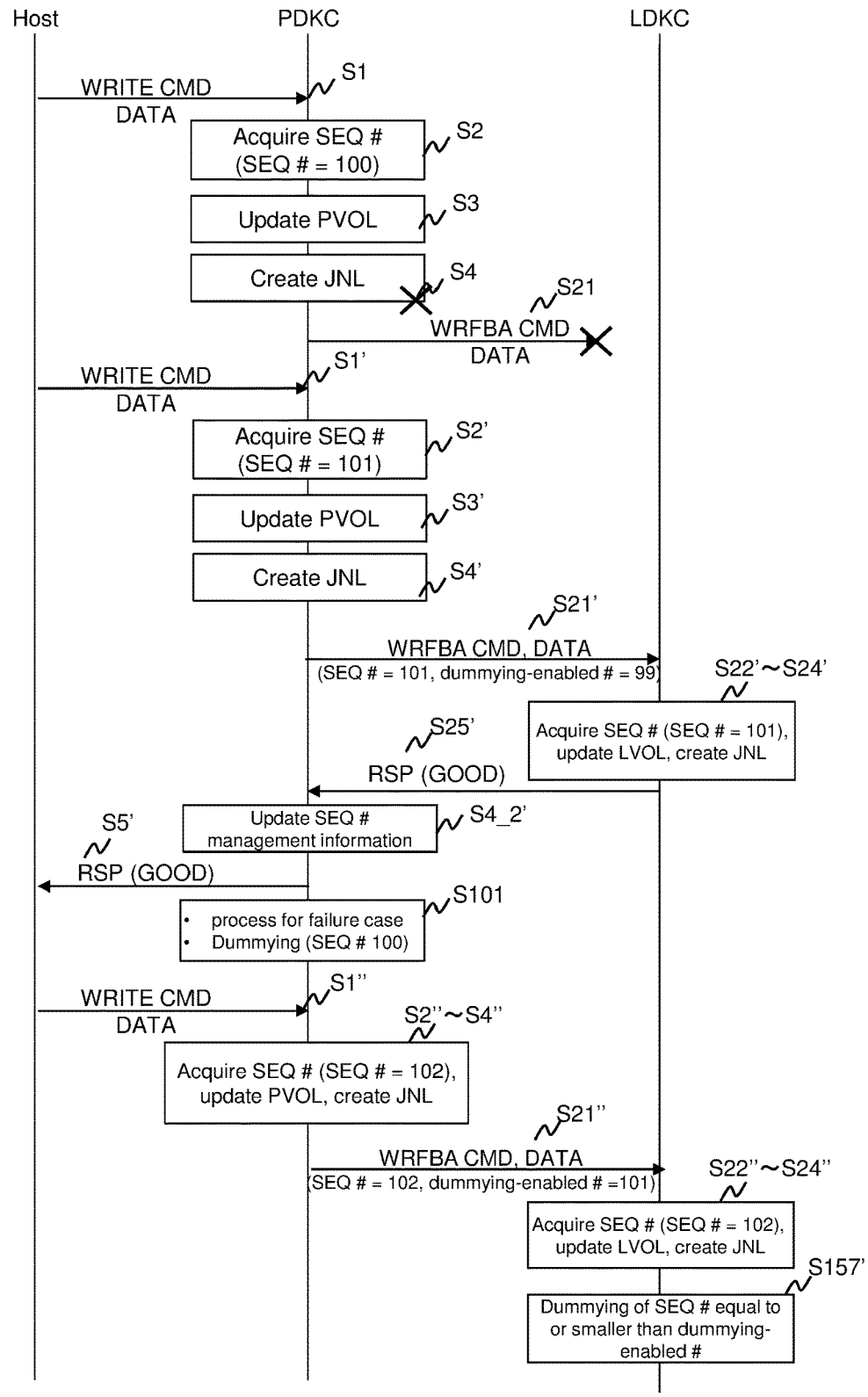
FIG. 15 is a view illustrating a flow of a command-based dummying process.

FIG. 15 illustrates a process example of a case where the transmission of write data received by the PDKC 11 in S1 to the LDKC 12 (transmission of WRFBA command) has failed, and at a somewhat later time, the PDKC 11 has detected the transmission failure. For example, it is an example of a case where the MP 141 having executed the processes of S1 through S1 stops, and somewhat later, a different (substitute) MP 141 detects that an event of process failure has occurred. In this case, the substitute MP 141 specifies the process having been executed when the MP 141 had stopped (in FIG. 15, the process related to the write request received in S1), and performs necessary processes (S101). Specifically, it responds to the host 3 that the process related to the write request received in S1 has failed, and if the SEQ# had been acquired in the process of S1 to S4 but the journal has not been created (such as when S4 is not executed), the dummying of the SEQ# is performed. By this dummying process, the dummy journal is created in the PDKC 11, and regarding the SEQ# management information of the PDKC 11, the created bit (T803) of SEQ# (T801) 100 is set to 1 and the duplication ongoing bit (T804) is set to 0. Furthermore, the created SEQ# (811) is set to 101.

Next, when a write request is received from the host 3 (S1"), the acquisition of SEQ#, the writing of write data to the P-VOL and journal creation are performed (S2" to S4"). Here, the SEQ# 102 is acquired and journal# 102 is created. The write request received in S1" can be the same as the write request issued by the host 3 in S1 (that is, retry of the write request), or can be different from the write request issued by the host 3 in S1.

After creating a journal (S4"), the PDKC 11 transmits a WRFBA command to the LDKC 12 (S21"). At this time, the PDKC 11 includes SEQ# 102 in the SEQ# (703) of the WRFBA command, creates a WRFBA command including the value of the created SEQ# (811) to a dummying-enabled SEQ# 705, and transmits the same to the LDKC 12.

The LDKC 12 having received the WRFBA command stores the write data received together with the received WRFBA command to the L-VOL, similar to S22 through S24, and creates a journal# 102 (S22" to S24"). Next, dummying is performed based on the dummying-enabled SEQ# 705 included in the WRFBA command (S157'). The dummying performed here is referred to as "command-based dummying".

In command-based dummying, the LDKC 12 specifies the row where the created bit (T803) is 0 among the rows within the SEQ# management table T800 where the SEQ# (T801) is equal to or greater than the created SEQ# (811) (or greater than the created SEQ# (811)) and equal to or smaller than the dummying-enabled SEQ# 705. In the example of FIG. 15, the journal of SEQ #100 is not yet created, so that dummying of the SEQ #100 is performed. In the storage system of the present embodiment, both timer-based dummying and command-based dummying are performed, and of these dummying processes, the dummying performed at an earlier time performs dummying of the SEQ #100. When a write request does not arrive from the host 3, the WRFBA command will not be issued from the PDKC 11 to the LDKC 12, so that dummying is performed by timer-based dummying. If write requests frequently arrive from the host 3, the WRFBA commands are issued from the PDKC 11 to the LDKC 12, so that dummying is performed by command-based dummying.

The above description describes a case where dummying (command-based dummying) is performed based on the dummying-enabled SEQ# 705 (that is, the SEQ# 101) included in the WRFBA command transmitted to the LDKC 12 after dummying had been performed in the PDKC 11 (S101), but the dummying-enabled SEQ# 705 is always included in the WRFBA command. This is because the PDKC 11 creates a WRFBA command including the value of the created SEQ# (811) to the dummying-enabled SEQ# 705. Therefore, the dummying-enabled SEQ# 705 is also included in the WRFBA command transmitted in S21' of FIG. 15 (or FIG. 12) (the dummying-enabled SEQ# 705 included in the WRFBA command transmitted here is 99). Although not illustrated, command-based dummying process is performed in the LDKC 12 having received the WRFBA command in S21'. However, at the point of time of S21', since journals have already been created for the SEQ# equal to or smaller than the dummying-enabled SEQ# (705) (SEQ# 99 or smaller), the dummying of a specific SEQ# will not be performed.

(8) Dummying (LDKC)

As described earlier, in the storage system according to the present embodiment, the LDKC 12 can receive a write request to the L-VOL. The following describes a dummying process performed in such a case where the creation of a journal including the acquired SEQ# had been stopped. It is assumed here that SEQ# 1 to 10 are already acquired and journals including SEQ# 1 to 10 (journal# 1 to 10) are also already created.

Figure 16:
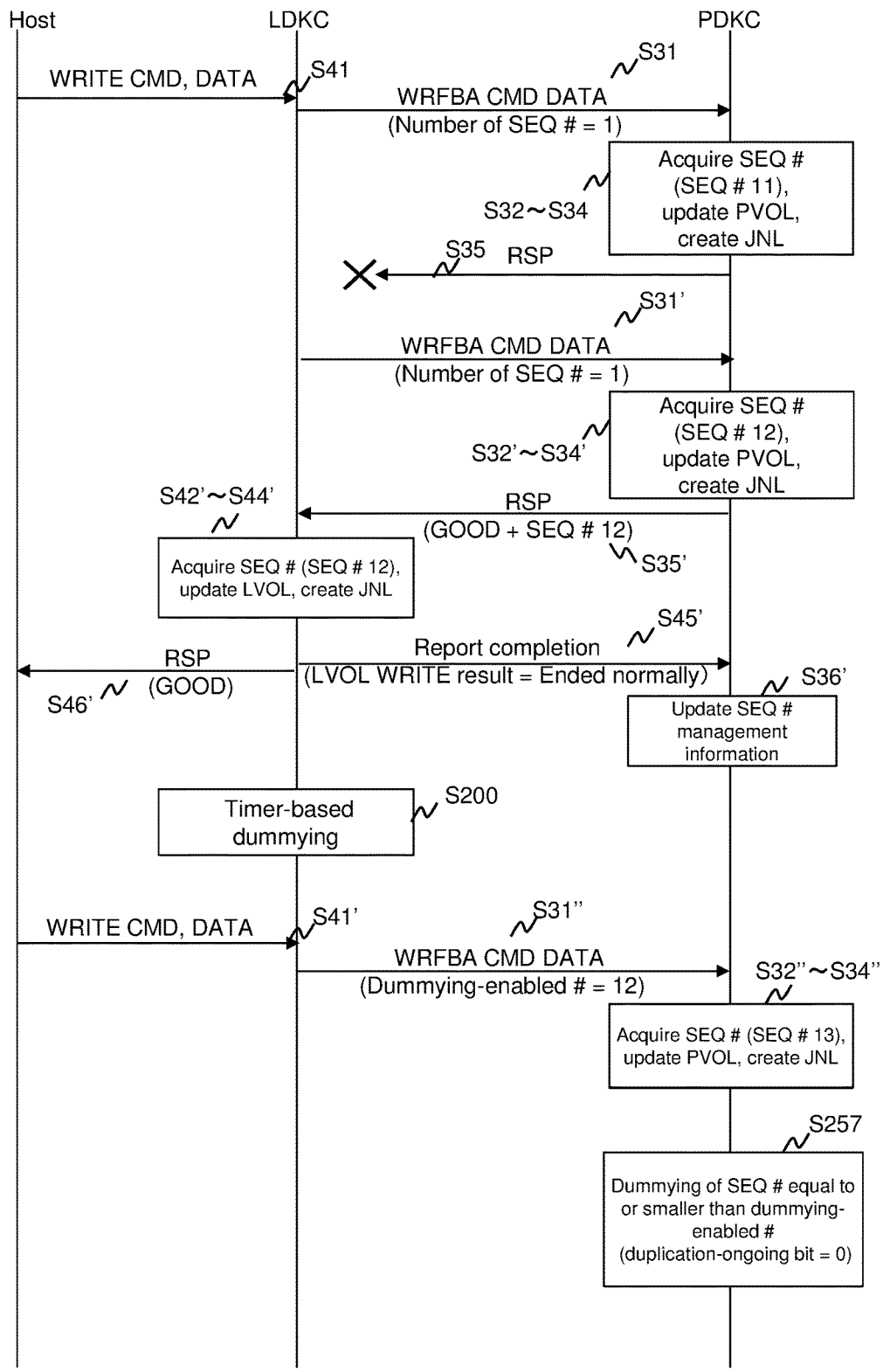
FIG. 16 is a view illustrating an overall flow of process performed during abnormality.

FIG. 16 shows the flow of the process performed when communication failure occurs between the PDKC 11 and the LDKC 12 after the LDKC 12 receives a write command from the host 3. The processes of S41 and S31 to S34 are similar to the processes illustrated in FIG. 9. In S32, the PDKC 11 acquires SEQ# 11 (since SEQ# 10 and smaller are already acquired).

FIG. 16 illustrates an example of a case where returning the response information (GOOD) indicating that the process related to the WRFBA command has been completed from the PDKC 11 to the LDKC 12 failed in S35, and the LDKC 12 could not receive the response information (GOOD). If a response information (GOOD) was not returned after the elapse of a given time after executing S41, the LDKC 12 retries transmission of the WRFBA command (S31').

The PDKC 11 having received the WRFBA command in S31' acquires the SEQ#, stores the write data to the P-VOL, and creates a journal (S32' to S34'). The SEQ# acquired in S32' is 12. This is because SEQ# 11 is already acquired in S32. Thereafter, the PDKC 11 returns a response information (GOOD) to the LDKC 12 (S35').

The SEQ# (712) included in the response information returned in S35' is 12 (SEQ# acquired in S32'). Therefore, the LDKC 12 acquires SEQ# 12 and creates a journal# 12 (S42' to S44'). SEQ# management information that the LDKC 12 has at the point of time when S44' is ended is shown in FIG. 17. At the point of time when S44 is ended, the SEQ# 11 is not yet created. This is because the LDKC 12 wasn't able to receive the SEQ# (712) included in the response information that should have been returned in S35. As a result, SEQ# 11 is not created in the LDKC 12. Further, the LDKC 12 cannot recognize whether SEQ# 11 has been acquired by the PDKC 11, or whether or not the journal# 11 has been created.

As described earlier with reference to FIGS. 12 and 13, the above-described timer-based dummying process is executed in the LDKC 12 (S200). In the example of FIG. 16, dummying of SEQ# 11 is performed by the timer-based dummying process performed in the LDKC 12. As have been described above, the timer-based dummying process is a periodically executed process, and it is not necessarily executed immediately after S46', as shown in FIG. 16.

In the timer-based dummying process executed in S200, similar to the process described above, the dummying is performed to the SEQ #s corresponding to the condition described above among the SEQ #s equal to or greater than the created SEQ# (811) and equal to or smaller than the acquired SEQ (813), if the created SEQ# (811) has not changed after the elapse of a journal duplication timeout time.

In a state where the LDKC 12 receives a write request from the host after SEQ# 11 has been dummied (S41'), the LDKC 12 issues a WRFBA command to transmit the write data received together with the relevant write request (S31"). The dummying-enabled SEQ# (705) included in the WRFBA command is 12. Therefore, in the PDKC 11 having received this WRFBA command, dummying (command-based dummying) of the SEQ# equal to or smaller than SEQ# 12 is executed (S257). This is substantially similar to the process described in S157', but differs from S157' in that the duplication ongoing bit (T804) is also changed by the command-based dummying performed in the PDKC 11.

The PDKC 11 specifies the rows in the SEQ# management table T800 where the created bit (T803) is 0 among the rows where the SEQ# (T801) is equal to or greater than the created SEQ# (811) and equal to or smaller than the dummying-enabled SEQ# 705. In the example of FIG. 15, a process to create a dummy journal will not be performed since journals are already created for the SEQ# equal to or smaller than the SEQ# 12 in the PDKC 11. However, as for the row where the SEQ# (T801) is 11 in the SEQ# management table (T800), the duplication ongoing bit (T804) is set to 1. In the command-based dummying performed in the PDKC 11, the duplication ongoing bit (T804) is set to 0 regarding the row where the SEQ# (T801) is greater than the created SEQ# (811) and equal to or smaller than the dummying-enabled SEQ# (705).

Figure 18:
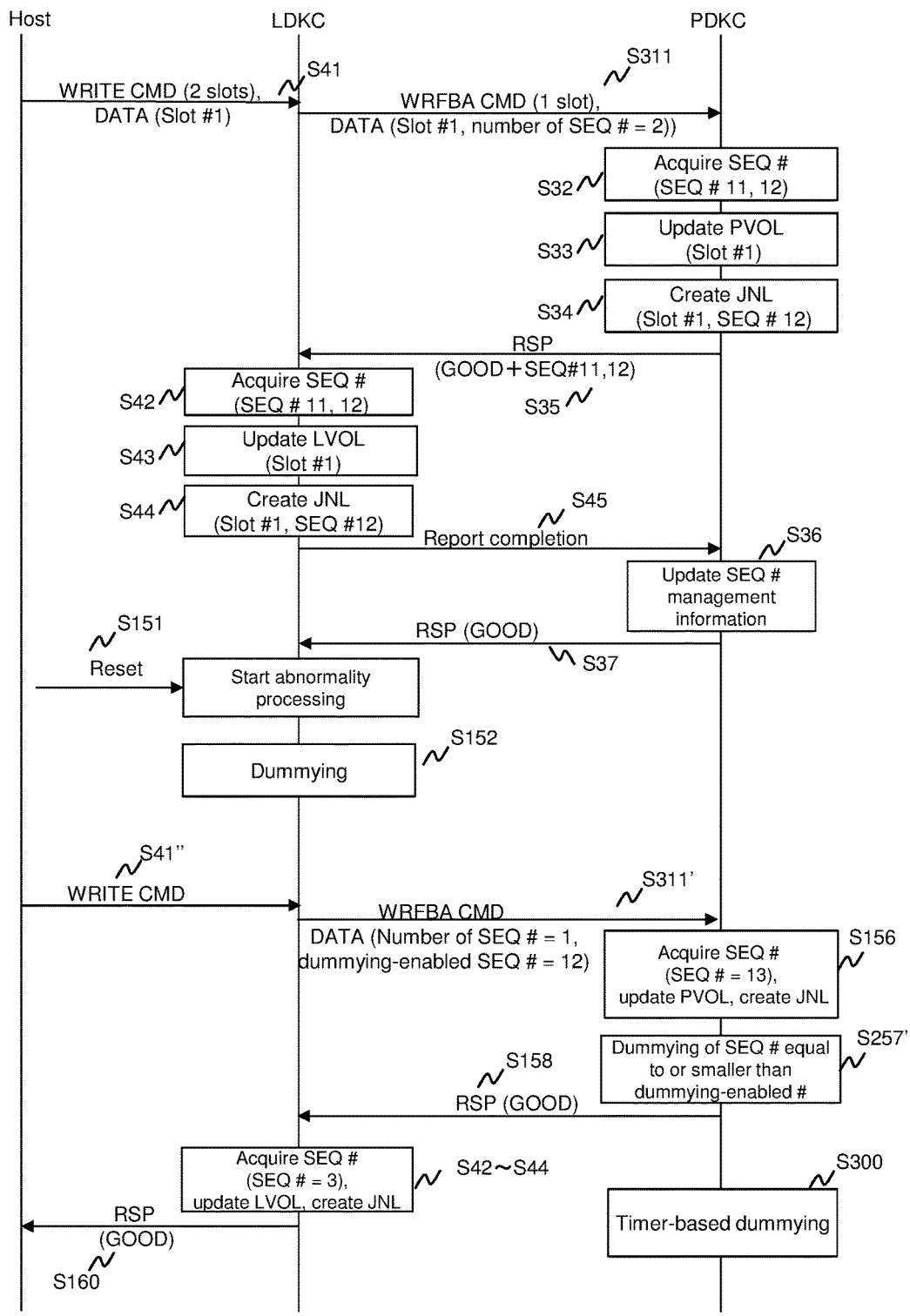
FIG. 18 is a view illustrating an overall flow of process performed during abnormality.

FIG. 18 shows a flow of the process performed in the primary storage system 1 when the LDKC 12 having received a write command from the host 3 has been instructed to discontinue the process from the host 3. The processes of S41 to S44 are similar to the processes illustrated in FIG. 9. However, FIG. 18 illustrates an example that a write request of a data having a longer size than the given length is received from the host 3 and that, as a result, WRFBA commands are issued from the LDKC 12 to the PDKC 11 by dividing and issuing the commands twice (S311). Hereafter, the maximum data size for transmitting the write data from the LDKC 12 to the PDKC 11 (or the other way around) by the WRFBA command is called "slot".

In S41 to S44, the transfer of data of a first slot is performed. The WRFBA command issued to the PDKC 11 in S41 includes information of the number of SEQ# (704). Since FIG. 18 illustrates an example where WRFBA commands are divided and issued twice when WRFBA commands are issued, 2 is stored in the number of SEQ# (704) of the WRFBA command issued in S31.

In S32, the PDKC 11 acquires the SEQ#, but since the number of SEQ# (704) is 2, two SEQ #s are acquired. The example of FIG. 18 illustrates an example of acquiring SEQ# 11 and SEQ# 12. In S33, the PDKC 11 stores write data corresponding to a single slot to the P-VOL, and creates journal# 12 in S34.

In S35, when the PDKC 11 returns response information (GOOD) to the LDKC 12, it returns the response information including 11 and 12 in the SEQ (712) of the response information. The LDKC 12 having received the response information executes the processes of S42 to S44. Since 11 and 12 are included in the SEQ (712) of the response information, the LDKC 12 acquires SEQ# 11 and SEQ# 12 in S42. Then, journal# 12 is created in S44. Thereafter, the LDKC 12 notifies the PDKC 11 that the creation of the journal has been completed (S45), and the PDKC 11 changes the duplication ongoing bit (T804) corresponding to the SEQ# (SEQ# 12) acquired in S32 to 0. Then, the PDKC 11 returns a GOOD Response to the LDKC 12 (S37).

The process of the write request received in S41 is not yet completed immediately after S37. For example, journal# 11 is not yet created in the PDKC 11 and the LDKC 12. If the LDKC 12 is instructed from the host 3 to discontinue (reset) the process at this point of time, it resigns continuation of the process related to the write request received in S41 (S151). At this point of time, the LDKC 12 has acquired the SEQ# for SEQ# 11, but has not created journal# 11. Since the uncreated state is not preferable, the LDKC 12 performs dummying of the SEQ #s (SEQ #s equal to or smaller than SEQ #12 whose journals including the relevant SEQ #s have not yet been created) having been already acquired at the point of time when discontinuation of process has been instructed from the host 3 (S152). At the same time, it updates the SEQ# management information in the LDKC 12. Thereby, regarding the rows where the SEQ# (T801) in the SEQ# management table (T800) is 12 or smaller, the acquired bit (T802) and the created bit (T803) are set to 1. Further, the created SEQ# (811) and the acquired SEQ# (810) are set to 12.

Thereafter, when a write request is received from the host 3 (S41"), the LDKC 12 transmits a WRFBA command to the PDKC 11 (S311'). As described above, the created SEQ# (811) is stored in the dummying-enabled SEQ# (703) of the WRFBA command. Therefore, the dummying-enabled SEQ# (705) of the WRFBA command issued here is 12. In the PDKC 11 having received the WRFBA command, the SEQ# equal to or smaller than 12 whose journals is not yet created (SEQ# 11 in the example of FIG. 18) is subjected to dummying via command-based dummying (S257').

A process similar to S157' of FIG. 15 is performed as the dummying performed in S257'. In other words, the rows in the SEQ# management table T800 where the created bit (T803) is 0 are specified among the rows where the SEQ# (T801) is equal to or greater than the created SEQ# (811) and equal to or smaller than the dummying-enabled SEQ# (705).

An example of the state of the SEQ# management information that the PDKC 11 has at the point of time of S311' will be illustrated in FIG. 19. Among the SEQ #s equal to or smaller than the dummying-enabled SEQ# (705) (that is, SEQ# 12) included in the WRFBA command, the row of SEQ# 11 has the created bit (T803) set to 0, so that the dummying of the SEQ# is executed.

In the above description, an example has been illustrated where the SEQ# 11 is subjected to dummying via command-based dummying, but if the write request from the host 3 (S41") does not arrive for a certain amount of time (specifically, the time exceeding the journal duplication timeout time), timer-based dummying (S300) is performed in the PDKC11. In that case, rows in the SEQ# management table T800 corresponding to conditions (a) or (b) described earlier are specified among the rows where the SEQ# (T801) is equal to or greater than the created SEQ# (811) and equal to or smaller than the acquired SEQ# (810). Also according to this case, the SEQ# 11 is specified as the dummying target SEQ#. This is because SEQ# 11 corresponds to condition (b).

By the PDKC 11 and the LDKC 12 performing the process described above, the dummying of journals is performed. As described with reference to FIG. 2, the journals stored in the journal volume in the LDKC 12 are transmitted to the RDKC 21 when the PDKC 11 is stopped. At this time, the L-VOL and the R-VOL are redefined as a volume pair. At this point of time, the data contents of R-VOL are the same as those of the L-VOL, excluding data which has not yet been transmitted from the PDKC 11 to the RDKC 21, and data stored in the journal volume of the RDKC 21 and not yet restored in the R-VOL. Therefore, at this time, the pair status is in "Duplex" state.

Then, in the RDKC 21, the journals not yet received from the PDKC 11 among the journals sent from the LDKC 12 are stored in the journal volume of the RDKC 21. If the journals stored in the journal volume of the RDKC 21 are restored in the R-VOL, the L-VOL and the R-VOL will be in a state where identical data are stored.

If the dummying of journals is not performed, journals having successive SEQ #s will not be sent from the LDKC 12 to the RDKC 21. For example, we will assume the case that journals respectively including SEQ# 102, 104 and 105 are created in the LDKC 12, and these journals are transmitted from the LDKC 12 to the RDKC 21 after the PDKC 11 has stopped. In the RDKC 21, prior to restoring the journal including SEQ# 104 or the journal including SEQ# 105, it awaits arrival of a journal including SEQ# 103. In other words, a situation may occur where journal restoration is discontinued.

Further, when a journal (normal journal) could not be created in the LDKC 12, to make the status of the L-VOL and the R-VOL Duplex state, it is possible to adopt a way to discard all the journals created in the LDKC 12 and to copy all the contents of the logical volume (L-VOL) in the LDKC 12 to the logical volume (R-VOL) in the RDKC 21. However, in this case, until all the data in the L-VOL is copied to the R-VOL, a state occurs where the contents of the L-VOL and R-VOL are not identical (state where there is no redundancy). This is not preferable since data will be lost if the LDKC 12 stops by causes such as failure during this state.

On the other hand, when dummying of journals is performed in the LDKC 12, journals having successive SEQ# will be sent from the LDKC 12 to the RDKC 21. In the RDKC 21, restoration of journals should be performed in the ascending order of the SEQ#. As for the dummy journal, it is ignored since data is not included, but at least, journal restoration will not be discontinued. Thereby, even if journal creation is discontinued in the LDKC 12, it is possible to prevent journal restoration from being discontinued during journal restoration performed in the RDKC 21.

(9) Initial Copy

An initial copy process is performed when creating a volume pair by the P-VOL in the PDKC 11 and the R-VOL in the RDKC 21. In the storage system according to the present embodiment, the access from the host 3 to the P-VOL (or the L-VOL) is accepted during initial copy process. The details of the initial copy process are disclosed, for example, in Patent Literature 1. Here, only the matters related to the present embodiment will be described. Only the initial copy process which is executed during pair creation of the P-VOL and the R-VOL will be described below, but initial copy process is also executed when creating pairs between the P-VOL and the L-VOL.

In the initial copy process, the PDKC 11 copies the data within the P-VOL sequentially to the R-VOL from the head area of the P-VOL. During the copy, the PDKC 11 creates journals including the data which was read from the P-VOL and stores the same in the journal volume. The journals stored in the journal volume are transmitted to the journal volume in the RDKC 21.

In the initial copy process, the PDKC 11 performs a copy process based on a copy pointer (T308). The copy pointer (T308) is information prepared for each volume pair within the PDKC 11, and in the storage system according to the present embodiment, it is managed by the pair management table T300 (FIG. 4).

Hereafter, the outline of the process when initial copy is performed for one volume pair will be described. The copy pointer (T308) prepared for this volume pair is referred to as "P". P is set to "0" in the initial state.

During the initial copy process, the data stored in the P-VOL of the initial copy target volume pair (hereinafter referred to as "target P-VOL") is copied to the R-VOL sequentially from the head area of the target P-VOL. Specifically, the PDKC 11 reads data from address P of the P-VOL, creates a journal, and adds 1 to P. By repeating this process until P exceeds the end address of the P-VOL, the data in the P-VOL is sequentially copied to the R-VOL.

During the initial copy process, that is, when the pair status of the volume pair of P-VOL and R-VOL is the "Initial-Copy state", when a write request to the P-VOL is received from the host 3, the PDKC 11 determines whether the address designated by this write request (the write destination address of the data; in the following description, it is referred to as a "write address") is equal to or smaller than the copy pointer (T308) or not. If the write address is equal to or smaller than the copy pointer (T308), the PDKC 11 creates a journal from the write data written by this write request, and stores the same in the journal volume. Further, this write data is also written to the P-VOL.

On the other hand, if the write address is not equal to or smaller than the copy pointer (T308), the PDKC 11 only writes the write data to the P-VOL and will not create a journal. Among the areas of the P-VOL, regarding the area whose address is greater than the copy pointer (T308), journals will be created sooner or later by the initial copy process performed simultaneously. Therefore, there is no need to create a journal at this point of time, so that if the write address is not equal to or smaller than the copy pointer (T308), the PDKC 11 will not create a journal. On the other hand, among the areas of the P-VOL, the area having an address equal to or smaller than the copy pointer (T308) is an area where journal creation has already been performed by the initial copy process, so that journal creation via initial copy process will no longer be performed. Therefore, in this case, the PDKC 11 must create a journal.

Figure 20:
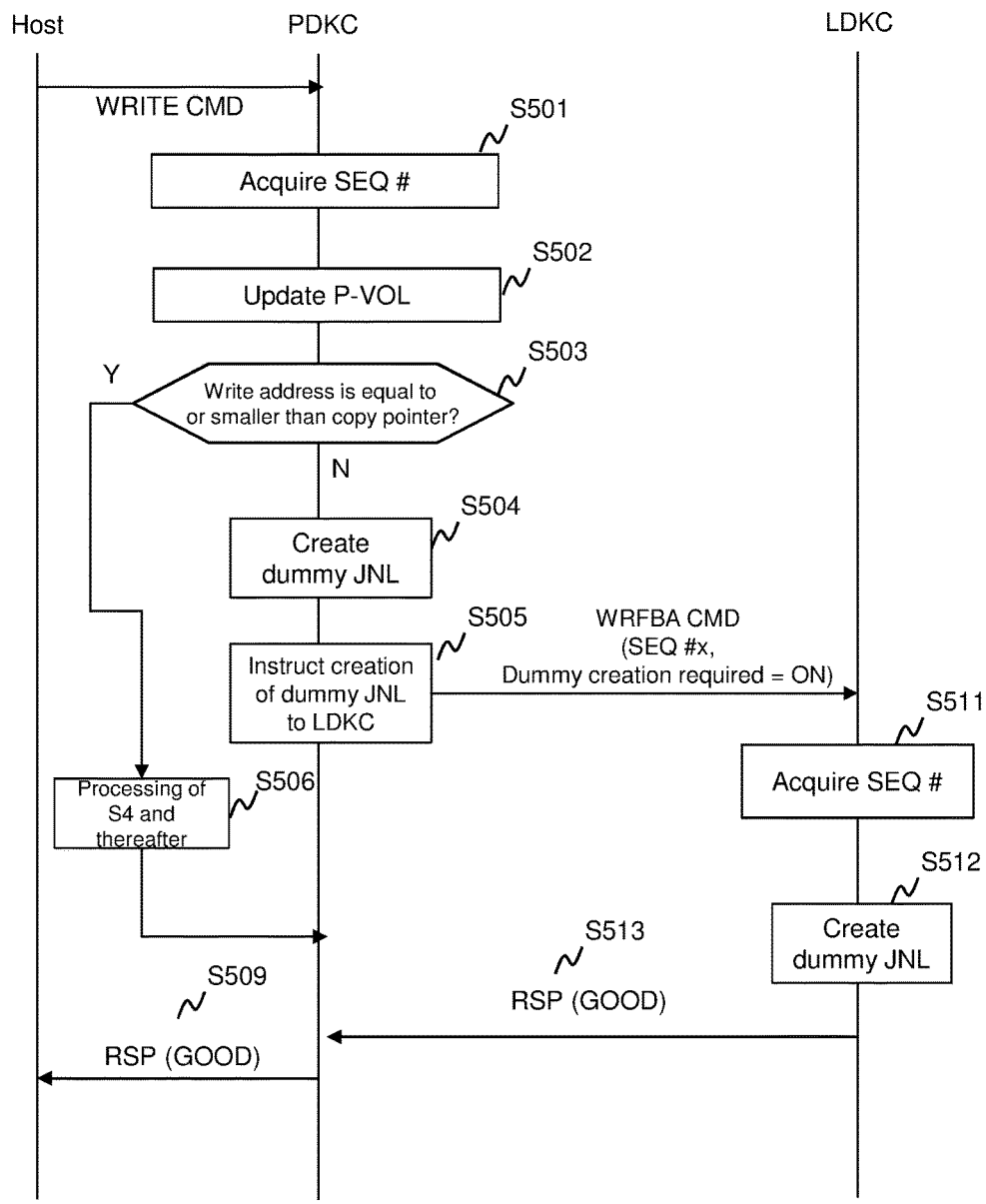
FIG. 20 is a view illustrating a process flow of a case where a write request is received during initial copy process.

With reference to FIG. 20, we will describe the flow of the process performed in the PDKC 11 and the LDKC 12 when a write request was received from the host 3 to the P-VOL during the initial copy process. When a write request from the host 3 to the P-VOL is received, the PDKC 11 acquires the SEQ# (S501). Then, the PDKC 11 writes the write data having been received together with the write request to the P-VOL (S502). The processes of S501 and S502 are similar to S2 and S3 in FIG. 8, for example.

Thereafter, the PDKC 11 determines whether the write address designated by the write request is equal to or smaller than the copy pointer (T308) or not (S503). If the write address is equal to or smaller than the copy pointer (T308) (S503: Y), the PDKC 11 and the LDKC 12 perform a similar process as the write process described in FIG. 8. In other words, by creating a journal (S4) and transmitting a WRFBA command to the LDKC 12 (S21), the PDKC 11 makes a replica of the write data stored in the L-VOL. Moreover, when the LDKC 12 receives the WRFBA command transmitted from the PDKC 11, it performs the processes of S22 to S25 in FIG. 8.

Thereafter, the PDKC 11 updates the SEQ# management information (S4_2), returns a write complete (Good Response) to the host 3 (S509; the same process as S5 in FIG. 8), and ends the process.

On the other hand, if the write address is not equal to or smaller than the copy pointer (T308) (S503: N), the PDKC 11 creates a dummy journal including the SEQ# acquired in S501 (S504). The dummy journal created here is to be stored in the journal volume of the PDKC 11. Further, by issuing a WRFBA command to the LDKC 11, the PDKC 11 instructs the LDKC 12 to create a dummy journal (S505). The SEQ# acquired in S501 is stored in the SEQ# (703) included in this WRFBA command, and the dummy creation required flag (706) included in the WRFBA command is set to 1. If the dummy creation required flag (714) within the received WRFBA command is 1, the LDKC 12 executes creation of the dummy journal (in contrast, if the dummy creation required flag (714) is 0, creation of dummy journal will not be performed).

The LDKC 12 having received the WRFBA issued in S505 acquires the SEQ# stored in this command (S511), since the dummy creation required flag (706) in this command is set to 1. This process is similar to S22 in FIG. 8. Then, it creates a dummy journal including the SEQ# included in the WRFBA command (S512), and returns a notice (Good Response) to the PDKC 11 that the process has ended normally (S513). Thereafter, the PDKC 11 returns a notice (Good Response) stating that the write process has ended to the host 3 (S509).

Figure 21:
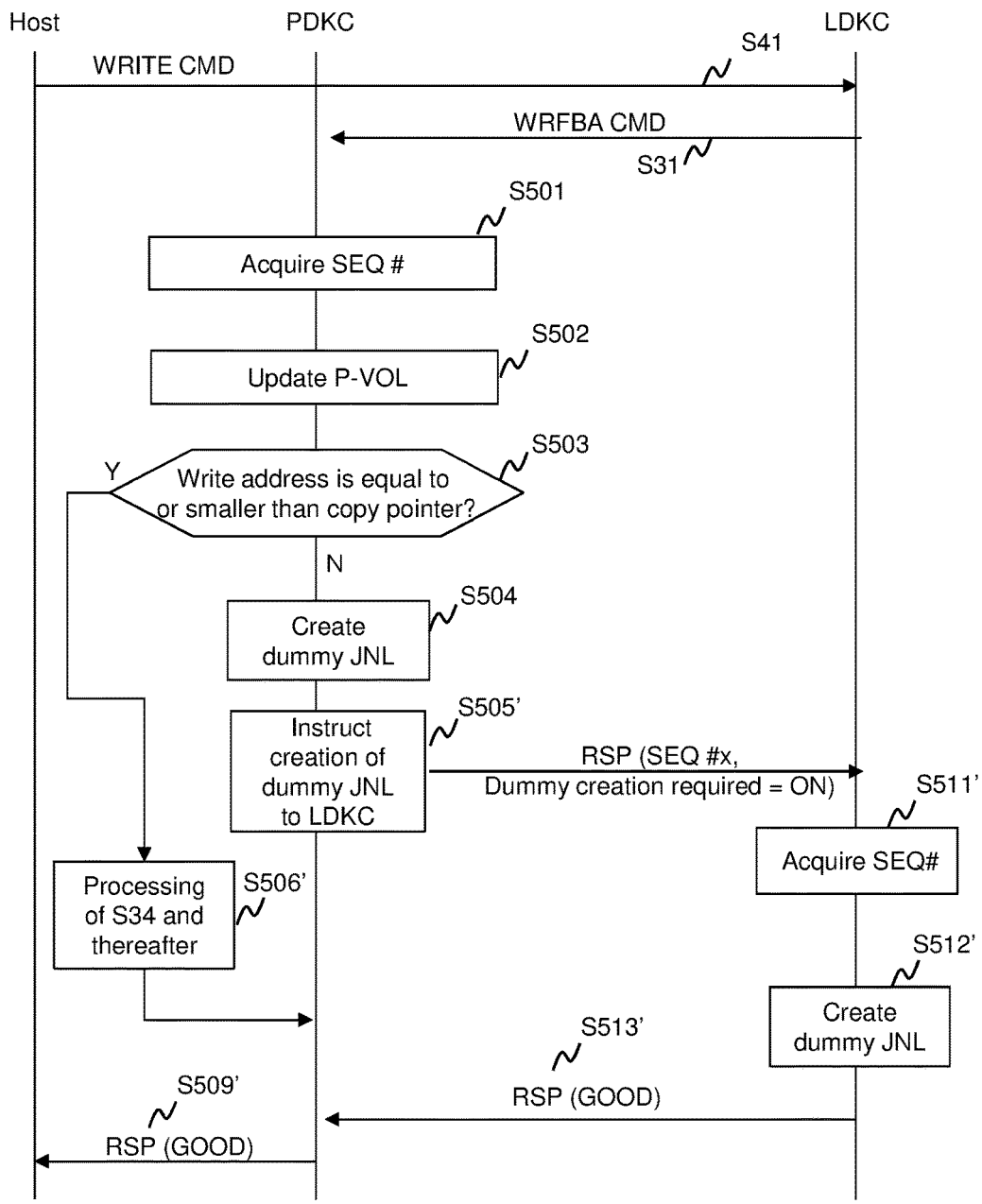
FIG. 21 is a view illustrating a process flow of a case where a write request is received during initial copy process.

In the above description, an example has been described where a write request from the host 3 to the P-VOL has been received during the initial copy process, but a similar process is performed when a write request from the host 3 to the L-VOL is received during the initial copy process. The flow of the process will be described with reference to FIG. 21.

When the LDKC 12 receives a write request from the host 3 to the L-VOL during the initial copy process (S41), as described with reference to FIG. 9, the LDKC 12 issues a WRFBA command to the PDKC 11 (S31). Thereafter, the processes of S501 to S502 are performed, which are the same as S501 and S502 in FIG. 20.

Next, the LDKC 12 determines whether the write address designated by the write request is equal to or smaller than the copy pointer (T308) or not (S503). If the write address is not equal to or smaller than the copy pointer (T308) (S503: N), the LDKC 12 creates a dummy journal including the SEQ# acquired in S501 (S504). The dummy journal created here is stored in the journal volume of the LDKC 11.

Furthermore, the LDKC 11 transmits response information with respect to the WRFBA command received in S31 to the LDKC 12 (S505'). As described earlier, the SEQ# (712) and the dummy creation required flag (714) are included in the response information of the WRFBA command. In the response information transmitted to the LDKC 12 in S505', the SEQ# acquired in S501 is stored in the SEQ# (712), and the dummy creation required flag (714) is set to 1. If the dummy creation required flag (714) of the received response information is 1, the LDKC 12 executes creation of the dummy journal.

Since the dummy creation required flag (714) is set to 1, the LDKC 12 having received the response information transmitted from the PDKC 11 in S505' acquires the SEQ# designated in the response information (S511'), and creates a dummy journal including this SEQ# (S512'). Thereafter, a notice (Good Response) stating that the process had ended normally is returned to the PDKC 11 (S513'), and the LDKC 12 having received this notice returns a notice (Good Response) that the write process has ended to the host 3 (S509).

If the write address is equal to or smaller than the copy pointer (T308) (S503: Y), the PDKC 11 and the LDKC 12 perform the same process as S34 and thereafter in FIG. 9, and ends the write process.

The preferred embodiment of the present invention has been illustrated above, but it is a mere example for understanding the present invention, and the scope of the present invention is not intended to be restricted to the embodiments described above. The present invention can be implemented in other various forms. For example, according to the storage system illustrated in the embodiment, the numbers of FEPKs 112 and MPBs 111 and other elements within the PDKC 11 and the LDKC 12 are not restricted to the numbers illustrated in the drawings. The present invention can be implemented even if the numbers of elements such as the FEPK 112 and MPB 111 in the PDKC 11 and the LDKC 12 differ.

In the above-described embodiment, an example is illustrated where the information of various tables included in the PDKC 11 and the LDKC 12 are stored in the SM. However, it is possible to have a part or all of the information stored in the SM replicated in the LM 142, and have the respective MPs 141 mainly use the information in the LM 142. Furthermore, the various management information used in the above description, such as the pair management table T300, can be managed using data structures other than tables.

According further to the embodiment illustrated above, the data stored in the P-VOL using the synchronous copy process is replicated in the L-VOL, but it is also possible to use the asynchronous copy process. According further to the preferred embodiment illustrated above, two types of functions for dummying the SEQ#, which are timer-based dummying and command-based dummying, have been described, but the storage subsystem is not necessary required to have both types of dummying functions. For example, a configuration can be adopted where only the timer-based dummying function is implemented.

According further to the above-described embodiment, the number of P-VOL, L-VOL and R-VOL are one, respectively, but it is possible to provide multiple P-VOLs, L-VOLs and R-VOLs. In that case, the storage system controls the order of data write to the P-VOLs, L-VOLs and R-VOLs so that the order of data write is maintained among the plurality of logical volumes (P-VOLs).

REFERENCE SIGNS LIST

1: Primary storage system, 2: Secondary storage system, 3: Host, 6: SAN, 11: Primary storage subsystem (PDKC), 12: Local storage subsystem (LDKC), 15: Quorum Storage, 21: Remote storage subsystem (RDKC), 110: Storage controller, 111: MPB, 112: FEPK, 113: BEPK, 114: CMPK, 115: Switch, 120: Disk unit, 121: Drive, 141: MP, 142: LM

The invention claimed is:

1. A storage system comprising a primary storage system equipped with a primary storage subsystem having a primary volume and a first journal volume and a secondary storage subsystem having a local volume in which replica of data stored in the primary volume is stored and a second journal volume, and a secondary storage system equipped with a remote storage subsystem having a remote volume in which replica of the data stored in the primary volume is stored and a third journal volume, wherein in a state where the primary storage subsystem stores a write data from a host to the primary volume, the primary storage subsystem determines a sequence number which is a serial number for specifying a write order of the write data, creates a journal including a replica of the write data and the determined sequence number, stores the created journal in the first journal volume, and transmits the created journal to the remote storage subsystem, in a state where the secondary storage subsystem receives the sequence number included in the journal stored in the first journal volume from the primary storage subsystem, the secondary storage subsystem stores the write data to the local volume, creates the journal including the replica of the write data and the sequence number, and stores the journal in the second journal volume, during normal operation, in a state where the primary storage subsystem stops creating the journal after determining the sequence number, the secondary storage subsystem creates a dummy journal including the determined sequence number and not including the write data, and stores the dummy journal in the second journal volume, and if a predetermined time has elapsed after the secondary storage subsystem creates a journal including a serial number larger than a second sequence number, without creating a journal including the second sequence number which is a serial number subsequent to a first sequence number, the secondary storage subsystem creates a dummy journal including the second sequence number, and stores the dummy journal in the second journal volume.

2. The storage system according to claim 1, wherein the secondary storage subsystem is configured to store the first sequence number as a created sequence number if journals including sequence numbers equal to and smaller than the first sequence number are all already created at a point of time when a journal including the first sequence number received from the primary storage subsystem is created, and if the created sequence number is not updated for a given period of time, the secondary storage subsystem creates a dummy journal including a sequence number not yet used for creating the journal among the sequence numbers which are greater than the created sequence number and equal to or smaller than a sequence number most recently received from the primary storage subsystem, and stores the dummy journal in the second journal volume.

3. The storage system according to claim 1, wherein when the primary storage subsystem stops creating the journal after determining the sequence number, the primary storage subsystem transmits information for creating a dummy journal including the determined sequence number to the secondary storage subsystem.

4. The storage system according to claim 3, wherein the secondary storage subsystem is configured to store the first sequence number as a created sequence number if journals including sequence numbers equal to or smaller than the first sequence number are all created at a point of time when a journal including the first sequence number received from the primary storage subsystem is created, the primary storage subsystem transmits a dummying-enabled sequence number which is information for specifying the sequence number that can be used to create the dummy journal as information for creating the dummy journal to the secondary storage subsystem, and when the secondary storage subsystem receives the dummying-enabled sequence number from the primary storage subsystem, the secondary storage subsystem creates the dummy journal including the sequence number among sequence numbers equal to or smaller than the dummying-enabled sequence number, greater than the created sequence number and not yet used for creating the journal, and stores the dummy journal in the second journal volume.

5. The storage system according to claim 4, wherein if journals have been created for all sequence numbers equal to and smaller than the second sequence number in the primary storage subsystem and the secondary storage subsystem at a point of time when the primary storage subsystem creates a journal including a second sequence, the primary storage subsystem transmits the second sequence number as the dummying-enabled sequence number to the secondary storage subsystem.

6. The storage system according to claim 5, wherein the primary storage subsystem stores the second sequence number as a primary-created sequence number, the secondary storage subsystem transmits the created sequence number to the primary storage subsystem, and when the primary storage subsystem receives the created sequence number from the secondary storage subsystem, the primary storage subsystem creates a dummy journal including the sequence number not yet used for creating the journal among sequence numbers greater than the primary-created sequence number and equal to or smaller than the created sequence number received from the secondary storage subsystem, and stores the dummy journal in the first journal volume.

7. The storage system according to claim 1, wherein when the primary storage subsystem receives a write request and write data to the primary volume while executing an initial copy process for replicating data stored in the primary volume to the remote volume, the primary storage subsystem 1) determines a sequence number to be included in the journal including a replica of the write data, 2) if a write destination address of the write data designated in the write request is an area where data replication to the remote volume by the initial copy has been completed, creates a journal including the sequence number determined in 1) and the replica of the write data, and 3) if a write destination address of the write data designated in the write request is an area where data replication to the remote volume by the initial copy has not been completed, creates the dummy journal including the sequence number determined in 1).

8. The storage system according to claim 1, wherein the remote storage subsystem is configured to store the journal transmitted from the primary storage subsystem to the third journal volume, and to perform restore process of storing a replica of the write data included in the journal to the remote volume sequentially in order from a journal whose sequence number included in the journal is small among a plurality of journals stored in the first journal volume, and when the primary storage subsystem stops, the secondary storage subsystem transmits the journal stored in the second journal volume to the remote storage subsystem.

9. A secondary storage subsystem having a local volume for storing replica of data stored in a primary volume of a primary storage subsystem, and a second journal volume, wherein when the primary storage subsystem stores a write data from a host to the primary volume, the primary storage subsystem determines a sequence number which is a serial number for specifying a write order of the write data, creates a journal including a replica of the write data and the determined sequence number, stores the created journal in the first journal volume of the primary storage subsystem, and transmits the created journal to a remote storage subsystem having a remote volume in which the replica of the data stored in the primary volume is stored, and a third journal volume, when the secondary storage subsystem receives the sequence number included in a journal stored in the first journal volume from the primary storage subsystem, the secondary storage subsystem stores the write data to the local volume, creates a journal including a replica of the write data and the sequence number and stores the journal in the second journal volume, during normal operation, when the primary storage subsystem stops creating the journal after determining a sequence number, the secondary storage subsystem creates a dummy journal including the determined sequence number and not including the write data, and stores the dummy journal in the second journal volume, and if a predetermined time has elapsed after the secondary storage subsystem creates a journal including a serial number larger than the second sequence number without creating a journal including the second sequence number which is a serial number subsequent to a first sequence number, the secondary storage subsystem creates a dummy journal including the second sequence number, and stores the dummy journal in the second journal volume.

10. The secondary storage subsystem according to claim 9, wherein when the primary storage subsystem stops creating the journal after determining the sequence number, the primary storage subsystem transmits information for creating a dummy journal including the determined sequence number to the secondary storage subsystem, and the secondary storage subsystem creates a dummy journal including a dummying-enabled sequence number based on the information, and stores the dummy journal in the second journal volume.

11. A method for controlling a storage system comprising a primary storage system equipped with a primary storage subsystem having a primary volume and a first journal volume and a secondary storage subsystem having a local volume in which replica of data stored in the primary volume is stored and a second journal volume, and a secondary storage system equipped with a remote storage subsystem having a remote volume in which replica of the data stored in the primary volume is stored and a third journal volume, wherein the primary storage subsystem is configured so that when storing a write data from a host to the primary volume, the primary storage subsystem determines a sequence number which is a serial number for specifying a write order of the write data, creates a journal including a replica of the write data and the determined sequence number, stores the created journal in the first journal volume, and transmits the created journal to the remote storage subsystem, the secondary storage subsystem is configured so that when the sequence number included in a journal stored in the first journal volume is received from the primary storage subsystem, the secondary storage subsystem stores the write data to the local volume, creates a journal including a replica of the write data and the sequence number and stores the journal in the second journal volume, during normal operation, in a state where the primary storage subsystem stops creating the journal after determining the sequence number, the secondary storage subsystem creates a dummy journal including the determined sequence number and not including the write data, and stores the dummy journal in the second journal volume, and if a predetermined time has elapsed after the secondary storage subsystem creates a journal including a serial number larger than a second sequence number, without creating a journal including a second sequence number which is a serial number subsequent to a first sequence number, the secondary storage subsystem creates a dummy journal including the second sequence number, and stores the dummy journal in the second journal volume.

12. The method for controlling a storage system according to claim 11, wherein when the primary storage subsystem stops creating the journal after determining the sequence number, the primary storage subsystem transmits information for creating a dummy journal including the determined sequence number to the secondary storage subsystem.

* * * * *